(12) United States Patent
Chong et al.

(10) Patent No.: US 12,165,027 B1
(45) Date of Patent: Dec. 10, 2024

(54) EXPERIMENTAL CONTENT GENERATION LEARNING MODEL FOR RAPID MACHINE LEARNING IN A DATA-CONSTRAINED ENVIRONMENT

(71) Applicant: StatSketch Inc., San Francisco, CA (US)

(72) Inventors: Anthony Chong, San Francisco, CA (US); Corne Nagel, Nairobi (KE); Samuel Owen, St. Louis, MO (US)

(73) Assignee: STATSKETCH INC., San Francisco, CA (US)

( * ) Notice: Subject to any disclaimer, the term of this patent is extended or adjusted under 35 U.S.C. 154(b) by 0 days.

(21) Appl. No.: 18/665,210

(22) Filed: May 15, 2024

(51) Int. Cl.
*G06N 20/00* (2019.01)
(52) U.S. Cl.
CPC .................... *G06N 20/00* (2019.01)
(58) Field of Classification Search
CPC ....................................................... G06N 20/00
See application file for complete search history.

(56) References Cited

U.S. PATENT DOCUMENTS

| | | | | |
|---|---|---|---|---|
| 2020/0034750 A1* | 1/2020 | Ritter | ............... | G06N 20/00 |
| 2021/0319363 A1* | 10/2021 | Gillberg | ............... | G06V 10/774 |
| 2023/0113602 A1* | 4/2023 | Rafferty | ............... | G06N 3/08 |
| | | | | 726/26 |
| 2023/0117530 A1* | 4/2023 | Armstrong | ............... | A63F 13/55 |
| | | | | 345/473 |

OTHER PUBLICATIONS

Mohaghegh, "PCGPT: Procedural Content Generation via Transformers", 2023. (Year: 2023).*

* cited by examiner

*Primary Examiner* — Dave Misir
(74) *Attorney, Agent, or Firm* — Alston & Bird LLP

(57) ABSTRACT

Various embodiments are directed to an example apparatus, computer-implemented method, and computer program product for rapid machine learning in a data-constrained environment. Such embodiments may include using a decision space generation model to generate candidate content data objects based on content generation objectives. Such embodiments may further include generating a first plurality of rated content data objects for a first target client based on a first experimental classification group and generating a second plurality of rated content data objects for a second target client based on a second experimental classification group. Such embodiments may further generate, based on a learning model, the first experimental classification group, and the second experimental classification group, a custom output content set including one or more of the first plurality of rated content data objects and one or more of the second plurality of rated content data objects.

20 Claims, 10 Drawing Sheets

EXPERIMENTAL CONTENT GENERATION LEARNING MODEL FOR RAPID MACHINE LEARNING IN A DATA-CONSTRAINED ENVIRONMENT

TECHNOLOGICAL FIELD

Embodiments of the present disclosure relate generally to content generation in a machine learning model, and more particularly to experimental content generation in a machine learning model for rapid machine learning in a data-constrained environment.

BACKGROUND

Machine learning systems typically require significant amounts of data in an initial data store to generate accurate predictions. In a data-constrained environment, initial results may be inaccurate. Many machine learning systems may require additional data collected over a long period of time before accurate predictions are realized.

Applicant has identified many technical challenges and difficulties associated with existing systems. Through applied effort, ingenuity, and innovation, Applicant has solved problems by developing solutions embodied in the present disclosure, which are described in detail below.

BRIEF SUMMARY

Various embodiments are directed to an example apparatus, computer-implemented method, and computer program product for rapid machine learning in a data-constrained environment. In an embodiment, an apparatus comprises one or more processors and one or more storage devices storing instructions that are operable, when executed by the one or more processors, to cause the one or more processors to generate, using a decision space generation model, a plurality of candidate content data objects based at least in part on one or more content generation objectives. The instructions further cause the one or more processors to generate, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group. The instructions further cause the one or more processors to generate, based at least in part on an experimental content generation learning model, the first experimental classification group, and the second experimental classification group, a custom output content set comprising one or more of the first plurality of rated content data objects and one or more of the second plurality of rated content data objects. The instructions further cause the one or more processors to generate, based at least in part on the custom output content set, one or more renderable content data objects. The instructions further cause the one or more processors to cause transmission of a first renderable content data object of the one or more renderable content data objects to the first target client and a second renderable content data object of the one or more renderable content data objects to the second target client. The instructions further cause the one or more processors to generate an updated content generation model based at least in part on first interaction data signals and second interaction data signals indicative of respective responsive actions associated with the first target client and the second target client. The instructions further cause the one or more processors to generate one or more updated renderable content data objects based at least in part on the updated content generation model.

In some embodiments, the first renderable content data object is associated with the first plurality of rated content data objects, and the second renderable content data object is associated with the second plurality of rated content data objects.

In some embodiments, each rated content data object comprises at least one of a content data object rank or a content data object score.

In some embodiments, the content data object rank or the content data object score is determined based at least in part on the one or more content generation objectives.

In some embodiments, each rated content data object comprises one or more variable interactive action characteristics.

In some embodiments, the one or more content generation objectives define a characteristic range for at least one of the one or more variable interactive action characteristics.

In some embodiments, the first experimental classification group and the second experimental classification group comprise a control group, an exploration group, or an exploitation group.

In some embodiments, the content generation model is configured to determine a control content data object based at least in part on the content data object rank or the content data object score.

In some embodiments, the content generation model is further configured to determine the control content data object based at least in part on the characteristic range, wherein the at least one of the one or more variable interactive action characteristics is within the characteristic range.

In some embodiments, generating the custom output content set further comprises selecting the control content data object from a plurality of rated content data objects in an instance in which an experimental classification group is the control group.

In some embodiments, generating the custom output content set further comprises selecting a rated content data object with a highest content data object rank or a highest content data object score in an instance in which an experimental classification group is the exploitation group.

In some embodiments, generating the custom output content set further comprises selecting a rated content data object according to an exploration group framework in an instance in which an experimental classification group is the exploration group.

In some embodiments, the exploration group framework is based at least in part on a random input.

In some embodiments, the one or more storage devices store instructions that are operable, when executed by the one or more processors, to further cause the one or more processors to determine, using an experimental tuning model, an optimal rated content data object based on a plurality of content generation objectives; and select the optimal rated content data object in the custom output content set.

In some embodiments, the one or more storage devices store instructions that are operable, when executed by the one or more processors, to further cause the one or more processors to generate, using a content generation model, a confidence value associated with each rated content data object in the first plurality of rated content data objects and second plurality of rated content data objects, wherein the confidence value corresponds with a confidence in the content data object rank or the content data object score associated with the rated content data object.

In some embodiments, the one or more storage devices store instructions that are operable, when executed by the one or more processors, to further cause the one or more processors to determine, using an experimental tuning model, a confidence enhancing content data object from a plurality of rated content data objects, wherein the confidence enhancing content data object increases the confidence value associated with one or more ranked content data objects; and select the confidence enhancing content data object in the custom output content set.

In some embodiments, the first interaction data signals are indicative of a first responsive action associated with the first target client and the second interaction data signals are indicative of a second responsive action associated with the second target client.

In some embodiments, the one or more updated renderable content data objects comprise a first renderable content data object associated with the first target client and a second renderable content data object associated with the second target client.

An example computer-implemented method is also provided. In an embodiment, the computer-implemented method comprises generating, using a decision space generation model, a plurality of candidate content data objects based at least in part on one or more content generation objectives. The computer-implemented method further comprises generating, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group. The computer-implemented method further comprises generating, based at least in part on an experimental content generation learning model, the first experimental classification group, and the second experimental classification group, a custom output content set comprising one or more of the first plurality of rated content data objects and one or more of the second plurality of rated content data objects. The computer-implemented method further comprises generating, based at least in part on the custom output content set, one or more renderable content data objects. The computer-implemented method further comprises causing transmission of a first renderable content data object of the one or more renderable content data objects to the first target client and a second renderable content data object of the one or more renderable content data objects to the second target client. The computer-implemented method further comprises generating an updated content generation model based at least in part on first interaction data signals and second interaction data signals indicative of respective responsive actions associated with the first target client and the second target client. The computer-implemented method further comprises generating one or more updated renderable content data objects based at least in part on the updated content generation model.

An example computer program product is also provided. In an embodiment, the example computer program product comprises at least one non-transitory computer-readable storage medium having computer-readable program code portions stored therein, the computer-readable program code portions comprising an executable portion configured to generate, using a decision space generation model, a plurality of candidate content data objects based at least in part on one or more content generation objectives. The executable portion is further configured to generate, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group. The executable portion is further configured to generate, based at least in part on an experimental content generation learning model, the first experimental classification group, and the second experimental classification group, a custom output content set comprising one or more of the first plurality of rated content data objects and one or more of the second plurality of rated content data objects. The executable portion is further configured to generate, based at least in part on the custom output content set, one or more renderable content data objects. The executable portion is further configured to cause transmission of a first renderable content data object of the one or more renderable content data objects to the first target client and a second renderable content data object of the one or more renderable content data objects to the second target client. The executable portion is further configured to generate an updated content generation model based at least in part on first interaction data signals and second interaction data signals indicative of respective responsive actions associated with the first target client and the second target client. The executable portion is further configured to generate one or more updated renderable content data objects based at least in part on the updated content generation model.

Various other embodiments are also described in the following detailed description and in the attached claims.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
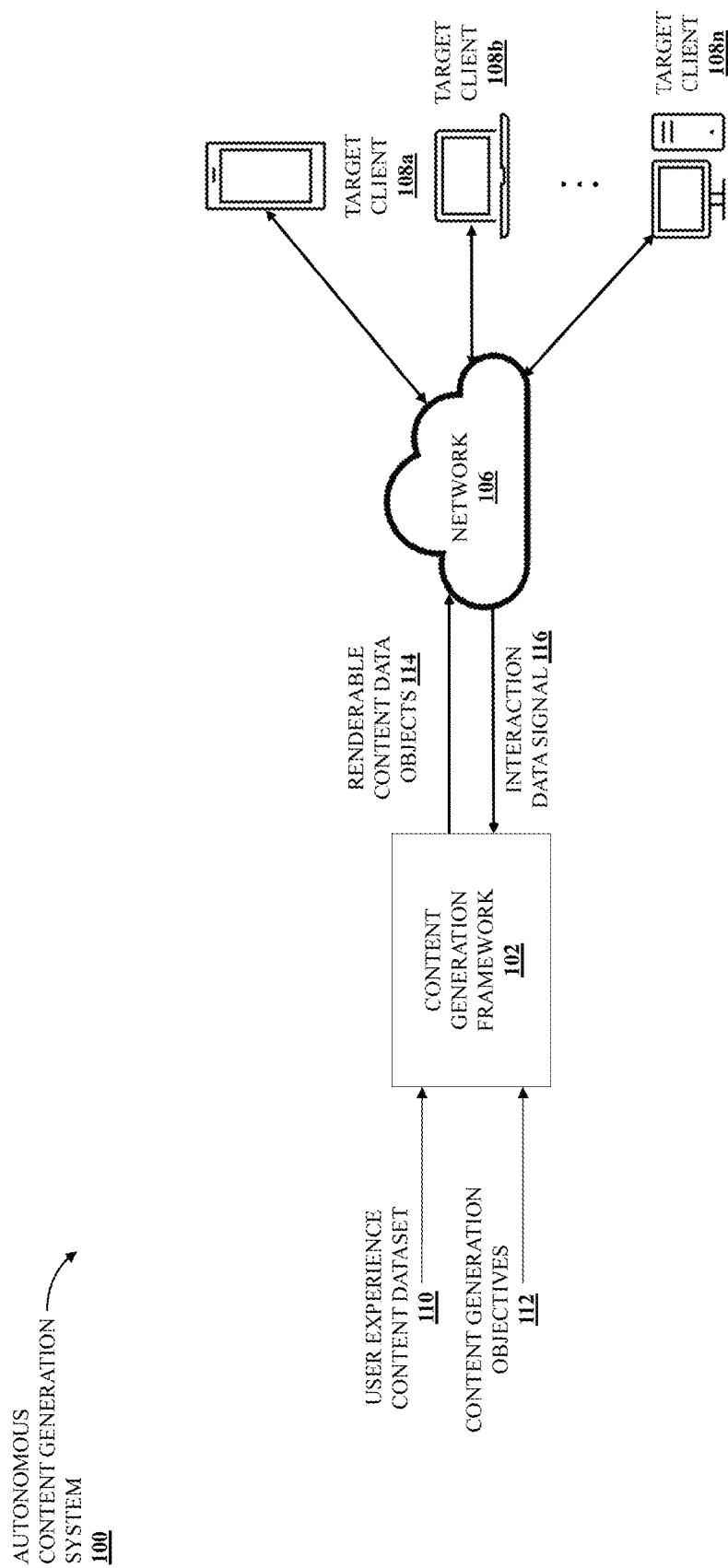
FIG. 1 illustrates a block diagram of an example autonomous content generation system in accordance with an example embodiment of the present disclosure.

Embodiments of the present disclosure now will be described more fully hereinafter with reference to the accompanying drawings, in which some, but not all, embodiments of the disclosure are shown. Indeed, embodiments of the disclosure can be embodied in many different forms and should not be construed as limited to the embodiments set forth herein, rather, these embodiments are provided so that this disclosure will satisfy applicable legal requirements. Like numbers refer to like elements throughout.

Overview

Various example embodiments address technical problems associated with generating renderable content data objects for one or more target clients interfacing with an autonomous content generation system leveraging a machine learning model in order to maximize content generation objectives. As will be appreciated, there are numerous example scenarios in which a machine learning model may be leveraged to generate renderable content data objects for one or more target clients.

Machine learning models utilize computer-implemented algorithms to uncover hidden (or apparent) insights, through machine-based learning, from historical relationships and trends in data. Machine learning models may generate reliable, repeatable decisions and results based on a set of features extracted from the data. Various machine learning models may be implemented depending on the type of available data, the desired output, the computing environment, and other factors. For example, a machine learning model may comprise a supervised learning machine learning model, an unsupervised machine learning model, a reinforcement learning machine learning model, or any combination thereof.

Utilization of a machine learning model in a machine learning environment may require two stages, a machine learning training process in which a machine learning model is trained based on a training dataset, and a machine learning classification process in which classifications or predictions are made based on the trained machine learning model. A machine learning training process adjusts parameters of the machine learning model based on the training dataset comprising, for example, a state of a machine learning environment and observed outcomes. A machine learning training process may require substantial amounts of training data related to the machine learning environment to generate accurate predictions. In some instances, accumulation of data in the training dataset may require collection of applicable training data, storage of the training data, preparation of the training data for ingestion in a machine learning training process, manual classification of training data, and so on, previous to execution of the machine learning training process. The development of a training dataset may be a very time consuming and labor-intensive process.

A machine learning training process of a machine learning model may occur prior to leveraging the machine learning model to perform classifications. In some instances, a machine learning model may be continually trained and updated during the machine learning classification process based on the states and outcomes observed during operation.

In some instances, particularly in a unique or new machine learning environment, the machine learning model may be launched in a data-constrained environment. In a data-constrained environment, in which available machine learning environment data is limited, initial classifications may be inaccurate or unreliable. The machine learning model may be continually trained and updated based on available machine learning environment data and outcomes, however, the training process is often slow, requiring a number of iterations before accurate and reliable outcomes may be predicted. Waiting for the machine learning model to improve in accuracy and reliability may be particularly problematic in instances in which iterations are spaced over days, weeks, months, or even years. As such, a machine learning model in a data constrained environment often suffers from inaccurate results for an extended period of time. In addition, the number of iterations required to train the machine learning model may be inhibitive to machine learning solutions in an instance in which the iterations are separated by a substantial period of time.

The various example embodiments described herein utilize various techniques to generate renderable content data objects based on machine learning model predictions received from a machine learning model configured for rapid machine learning in a data-constrained environment. For example, a content generation framework within an autonomous content generation system may leverage one or more machine learning models to generate renderable content data objects intended for target clients in order to maximize one or more content generation objectives.

In some examples, a content generation framework may include a content generation model, configured to utilize a machine learning model to generate a plurality of rated content data objects each rated content data object including at least a content data object, an associated data object score, and a data object confidence. A content generation model comprising a machine learning model may be continually updated based on interaction data returned from one or more target clients and the content generation learning model state to improve predictions and scores relative to the rated content data objects. For example, the content generation model may utilize reinforcement learning using the aforementioned feedback mechanism to improve the rated content data object output over time.

Embodiments of the present disclosure may further use an experimental content generation learning model to guide and improve the training of the content generation model. The experimental content generation learning model may, for example, select one or more content data objects from the rated content data objects according to a trained machine learning model trained to one or more predetermined criteria (e.g., model improvement speed, maximum ROI, etc.). For example, the plurality of rated content data objects may be provided to the experimental content generation learning model configured to select a content data object based on a classification group of the target client. For example, an experimental content generation learning model may be configured to select a content data object from the set of rated content data objects based on the classification of a target client in a control group, an exploitation group, or an exploration group. In some embodiments, the experimental content generation learning model may utilize reinforcement learning.

In some embodiments, the experimental content generation learning model may be informed by an experimental tuning model configured to leverage the content generation learning model state, including interaction data from the target clients, to determine the classification group for a particular renderable content data object and/or to determine the selected content data object for presentation to the target client. In some embodiments, the experimental tuning model may utilize a machine learning model, specifically trained to inform the selection of the classification group for a particular content data object and/or to determine the selected content data object. For example, the machine learning model utilized by the experimental tuning model may select a content data object based on one or more complex objectives, for example, multiple primary objectives. In addition, the machine learning model utilized by the experimental tuning model may select a content data object based on a content data objects likelihood to enhance the performance of the content generation framework, for example, based on interaction data received from a target client interacting with the selected content data object.

The content data object selected by the experimental content generation learning model is provided to the intended target client as a renderable content data object via a network interface. Based on the responsive action of the target client in relation to the renderable content data object, interaction data may be returned to the content generation framework and utilized to update one or more machine learning models of the content generation framework.

As a result of the herein described example embodiments, the accuracy and reliability of a machine learning model configured to generate custom content data objects at a target client may be rapidly improved. By programmatically dividing the renderable content data objects provided at target clients based on a group classification, the machine learning models within a content generation framework may be trained in a more efficient manner. Efficiency gains in the training process may enable the launch of a content generation framework in a classification phase with little or no training phase.

In addition, fewer training iterations are required to realize improved prediction accuracy and reliability. Reduction in the number of required training iterations may be particularly helpful in an environment in which days, weeks, months, or even years separate iterations of distributed content data objects. Reduction in the number of training iterations enables the use of content data object generation in new and unique environments with little or no historical data and/or lengthy time delays between iterations.

Efficiency gains in the learning process may reduce the data volume required to train and operate a content generation framework. Reduction in data results in a storage-wise efficient content generation framework, reducing the memory required to operate the content generation framework and improving the overall performance of the system.

Leveraging an experimental content generation learning model utilizing various frameworks according to an experimental classification group may result in the discovery of globally optimal solutions in an instance in which previous machine learning models may converge on a locally optimal solution. For example, by generating content data objects for a subset of target clients according to an exploration group framework, a machine learning model utilizing an experimental content generation learning model may explore parts of the decision space ignored in previous machine learning models.

Example Terminology

The term "autonomous content generation system" refers to computing devices, interfaces, interconnects, and other electronic components configured to support interactions between one or more computing devices, a content generation framework, a network, and a plurality of target client devices. Example electronic components may include a terminal for the input of a user experience content dataset and content generation objectives to the content generation framework. The content generation framework generates renderable content data objects that are transmitted via a network to target clients. The content generation framework receives interaction data from the target clients based on responsive actions recorded by the target clients.

The term "content generation framework" refers to one or more computing devices configured to generate renderable data objects to be provided to a target client. The content generation framework receives interaction data indicative of a responsive action taken by the target client to the provided renderable data object. A content generation framework may include one or more machine learning models configured to determine custom renderable data objects for a target client to maximize one or more content generation objectives. The content generation framework is configured to train one or more machine learning models in real-time (e.g., online training) while in use. During initialization and throughout operation, the content generation framework may also accept user experience content datasets to refine various parameters and hyperparameters comprising the one or more machine learning models. A non-limiting example of a content generation framework may include a web service operated by a vendor and configured to generate and distribute custom promotions to existing and perspective customers.

The term "user experience content dataset" refers to one or more data structures mapping one or more features or characteristics of a target client and one or more responsive actions performed by the target client. A non-limiting example of a user experience content dataset may include a database including historical customer data, such as customer demographic data, interests, spending habits, and redeemed promotions.

The term "content generation objectives" refers to one or more data structures including parameters by which responsive action taken by a target client may be quantified. Content generation objectives may further include limitations related to content data objects, for example characteristic ranges limiting the possible values for variable interactive action characteristics and/or characteristic step limitations related to the change in variable interactive action characteristics over a period of time. Example content generation objectives of an example vendor may include maximizing return on investment, minimizing customer churn, increasing checkouts on viewed content data objects, increasing speed of checkouts, and so on.

The term "content data object" refers to one or more data constructs including data content, generated by a content generation framework and intended to induce a responsive action from a particular target client. In one or more embodiments, example data content may include a message, a status update, an offer, an instruction set, or similar content. A content data object may further include a mode of data content delivery (e.g., transmission via one or more communication protocols and/or routes, such as triggering a short message service message, email, or other transmission over one or more selected networks). In some embodiments, a content data object may be embodied as a renderable content data object including a visual display to be presented to a target client and configured to induce a responsive action.

The term "target client" refers to one or more computing devices, machines, services, applications, or other entity for which a content generation framework is configured to generate renderable content data objects. A target client may be associated with a user identifier, which may be one or more items of data by which a user may be uniquely identified. A target client is associated with one or more quantifiable characteristics relating to the state of the target client and/or the associated user and configured to produce one or more responsive actions in response to the receipt of a content data object.

The term "responsive action" refers to one or more data signals transmitted by a target client representing an action taken by the target client, and/or a user associated with the target client, in response to receiving a content data object. A responsive interaction may include the transmission of one or more data packets and/or other electronic interaction performed by the target client in response to receiving the content data object. In some embodiments, a responsive action may be performed by a user associated with a target client. For example, viewing, clicking on, hovering over, or otherwise interacting with a content data object by a user at a target client may constitute a responsive action.

The term "interaction data" refers to one or more data objects or set of data objects indicating characteristics related to a responsive action executed by a target client. In addition to indicating the response action performed, interaction data may include further characteristics of the responsive action such as the duration of the responsive action, the input method of the responsive action, the electronic device type used to interact with the renderable content data object, and so on. In a non-limiting example, interaction data may include a data packet identifying a target client, the renderable content data object transmitted (e.g., promotion details) to the target client, and the responsive action (e.g., redeemed the promotion) taken by the target client.

The term "content generation model" refers to one or more trained machine learning models configured to generate rated content data objects based on candidate content data objects, one or more content generation objectives, and the content generation learning model state of a target client. Rated content data objects may include content data object metrics such as predicted content data object ranks, content data object scores, confidence values, or other metrics associated with one or more content data objects of the set of candidate content data objects. The content generation model may include one or more trained machine learning models configured to generate one or more content data object metrics.

The term "decision space generation model" refers to one or more trained machine learning models configured to generate a plurality of candidate content data objects based on the learning model expanded state. The candidate content data objects include content data objects generated based on the particular target client and in compliance with one or more characteristic ranges and characteristic step limitations based at least in part on the content generation objectives.

The term "learning model expanded state" refers to one or more data constructs representing the state of the target client and including expanded state characteristics of the target client based on the content generation learning model state. For example, a supervised learning model may include a machine learning model configured to determine expanded state characteristics of the target client based on the content generation learning model state. The expanded state characteristics may be combined with the content generation learning model state to generate the learning model expanded state.

The term "expanded state characteristics" refers to one or more characteristics of the current state of the learning environment related to the target client that may be derived from the content generation learning model state. Non-limiting examples of expanded state characteristics may include the status of a target client in relation to a vendor, for example, whether the associated user is a potential customer, new customer, existing customer, or dormant customer. Other expanded state characteristics may include the likelihood of an associated customer to churn or cease interactions with the vendor.

The term "characteristic range" refers to a range of authorized values for one or more variable interactive action characteristics of a content data object. Characteristic ranges may be authorized by one or more content generation objectives.

The term "characteristic step limitation" refers to a maximum step size for one or more variable interactive action characteristics over a defined period. For example, a content generation objective may indicate that a voucher amount is to have a maximum step size of 10% per iteration. Thus, the voucher amount may move up or down only 10% for each iteration of renderable content data object presented to the target client.

The term "content generation learning model state" refers to one or more data constructs representing the current state of the target client for which a content data object may be provided. The content generation learning model state includes updated data based on interaction data in response content data objects previously provided to the target client. A current content generation learning model state refers to a content generation learning model state including recent data related to the associated target client and recent responsive actions performed by a target action in relation to one or more renderable content data objects.

The term "supervised learning model" refers to one or more trained machine learning models based on traditional supervised learning techniques and configured to generate a learning model expanded state based on the content generation learning model state. A learning model expanded state includes expanded state characteristics of the target client based on the current content generation learning model state.

The term "experimental content generation learning model" refers to a special purpose computing entity configured to select one or more content data objects in a custom output content set based on the target client and an experimental classification group associated with a selected content data object. The selected content data object may be adjusted, transformed, or otherwise replaced based on a classification of a target client in an experimental classification group. In some embodiments, the experimental content generation learning model may include one or more trained machine learning models configured to determine the experimental classification group and/or the one or more content data objects to be transmitted to the target client. In some embodiments, the experimental tuning model may aid in the determination of the experimental classification group and/or the one or more content data objects to be transmitted to the target client.

The term "experimental classification group" refers to one or more labels, classifications, or similar identifiers assigned to a content data object received at the experimental content generation learning model. In some embodiments, the experimental classification group may comprise an exploitation classification group, an exploration classification group, or a control classification group.

The term "experimental tuning model" refers to one or more trained machine learning models configured to adjust, transform, or otherwise replace a selected content data object based on one or more learning-based objectives. For example, an experimental tuning model may select a confidence enhancing content data object based on a learning-based objective. In another example learning-based objective, the experimental tuning model may select a content data object in compliance with multiple content generation objectives based on the output of the experimental learning model.

The term "confidence enhancing content data object" refers to one or more content data objects selected based on a likelihood that a content data object confidence value associated with a target client or set of target clients may increase. For example, a content data object may be selected to maximize the information learned from transmitting the content data object to the target client and observing the responsive action of the target client.

The term "environment interface" refers to hardware, software, and/or a combination thereof configured to transmit renderable content data objects and receive interaction data via a network. The environment interface may be configured to compile the interaction data with historical data and other characteristics of the target client to generate a content generation learning model state. Non-limiting examples may include an application programming interface (API) facilitating communication between the content generation framework and one or more target clients; file transfer protocol configured to facilitate the transfer of one or more files between the content generation framework and one or more clients; mutual access to a database; and so on.

The terms "trained machine learning model," "machine learning model," "model," or "one or more models" refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised learning or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network).

In some embodiments, the model can be trained and/or trained in real-time (e.g., online training) while in use. For example, a machine learning model may be trained based on reinforcement learning. A reinforcement learning may receive rewards or penalties based on actions taken or predictions. Reinforcement learning is based on rewarding desired behaviors and punishing undesired ones. A reinforcement learning model is configured over time to perform actions that lead to maximum reward. A reinforcement learning model includes an agent configured to take actions, receive rewards based on the actions, and update the machine learning model to maximize the received reward.

The machine learning models, one or more models, trained machine learning models, legitimacy prediction models, improper dispute prediction models, resource volume prediction models, and disputed network transaction prediction models as described above may make use of multiple ML engines, e.g., for analysis, recommendation generating, transformation, and other needs.

The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models are known in the art and are typically some form of neural network. The term refers to the ability of systems to recognize patterns on the basis of existing algorithms and data sets to provide solution concepts. The more they are trained, the greater knowledge they develop.

The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders) to generate definitions and elements.

In various embodiments, the ML models may undergo a training or learning phase before they are released into a production, runtime, or classification phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein.

The terms "classifier algorithm" or "classification algorithm" refer to a classifier algorithm which estimates a classification model from a set of training data. The "classifier algorithm" uses one or more classifiers and an associated algorithm to determine a probability or likelihood that a set of data belong to another set of data. A decision tree model where a target variable can take a discrete set of values is called a classification tree (e.g., and therefore can be considered a classifier or classification algorithm).

The terms "supervised model" and "predictive model" refer to a supervised model, which is an estimate of a mathematical relationship in which the value of a dependent variable is calculated from the values of one or more independent variables. The functional form of the relationship is determined by the specific type (e.g., decision tree, Generalized Linear Model, gradient boosted trees) of supervised model. Individual numeric components of the mathematical relationship are estimated based on a set of training data. The set of functional forms and numerical estimates a specific type of supervised model can represent is called its "hypothesis space".

The term "feature vector" refers to an n-dimensional vector of features that represent an object. N is a number. Many algorithms in machine learning require a numerical representation of objects, and therefore the features of the feature vector may be numerical representations.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

Example System

Referring now to FIG. 1, a block diagram of an example autonomous content generation system 100 is provided. As depicted in FIG. 1, the example autonomous content generation system 100 includes a content generation framework 102 configured to send renderable content data objects 114 to one or more target clients 108a-108n via a network 106 and receive interaction data signals 116 from the one or more target clients 108a-108n via the network 106. The content generation framework 102 is further configured to receive a user experience content dataset 110 and content generation objectives 112.

As depicted in FIG. 1, the example autonomous content generation system 100 includes a content generation framework 102. The content generation framework 102 is a special purpose computing entity configured to support one or more machine learning models for providing one or more renderable content data objects 114 to a target client 108a-108n. A content generation framework 102 is configured to determine a custom renderable content data object 114 specifically selected for a target client 108a-108n based on one or more desired outcomes provided at least in part by the content generation objectives 112. A content generation framework 102 may utilize the one or more machine learning models to determine the success of a content generation framework 102 based on the interaction data signals 116 returned by the target client 108a-108n.

As further depicted in FIG. 1, the content generation framework 102 is configured to interact with one or more target clients 108a-108n. The content generation framework 102 is configured to generate one or more renderable content data objects 114 based on one or more characteristics of the target client 108a-108n and/or associated user. For example, in some embodiments, a target client 108a-108n may be associated with a customer or potential customer of a vendor operating the content generation framework 102. Customers may include businesses, consumers, or other entities. In such an embodiment, characteristics of the user associated with the target client 108a-108n may include demographic data related to the consumer, such as, age, income, employment status, education, ethnicity, occupation, gender, marital status, political affiliation, geographic location, family makeup, nationality, interests, living status, and so on.

In addition, characteristics of the target client 108a-108n may include certain characteristics related to the status of the user associated with the target client 108a-108n with the vendor. For example, a user associated with a target client 108a-108n may be classified as a potential customer, new customer, existing customer, or dormant customer. In some embodiments, the content generation framework 102 may be configured to determine the relationship of the user associated with the target client 108a-108n to the vendor based on the characteristics of the target client 108a-108n. For example, a user associated with a target client 108a-108n may be classified as a potential customer, new customer, existing customer, or dormant customer based on the duration of the relationship of the user with the vendor. In addition, a user associated with a target client 108a-108n may be classified as a potential customer, new customer, existing customer, or dormant customer based on the number or type of interactions between the vendor and the user.

Based on the characteristics of the users associated with the target clients 108a-108n certain risks and/or opportunities may be associated with each user. A risk of a user may include any interaction between the vendor and the target client 108a-108n exhibiting a negative outcome for the vendor. For example, risks may include churn, meaning the user associated with the target client 108a-108n ceases interactions with the vendor. In some instances, the user associated with the target client 108a-108n may cease making purchases from the vendor.

Certain opportunities may also be available to a vendor based on the characteristics of a user associated with a target client 108a-108n. For example, a vendor may have an opportunity to increase interaction volumes with a target client 108a-108n (e.g., increased sales volume). In addition, a vendor may increase the types of interaction with a target client 108a-108n. For example, a vendor may provide additional products or services that a target client 108a-108n may utilize (e.g., cross sell).

In some embodiments, the status of the target client 108a-108n may be determined by a content generation framework 102 based on the received interaction data signals 116 in conjunction with characteristics of the target client 108a-108n. In addition, the likelihood of certain risks and/or opportunities of a user associated with the target client 108a-108n may be generated based on the received interaction data signals 116 in conjunction with characteristics of the target client 108a-108n.

As further depicted in FIG. 1, the content generation framework 102 is configured to generate renderable content data objects 114 specific to a target client 108a-108b. The renderable content data objects 114 may include electronic message data, notification data, communication channel data, metadata, and/or other data. The renderable content data objects 114 are selected to illicit a responsive action from the intended target client 108a-108n and/or a user associated with the intended target client 108a-108n and corresponding to a content generation objective. For example, a renderable content data object 114 may request a response, trigger an action at the target client 108a-108n, provide an interface or graphic at a display of the target client 108a-108n, generate a notification, email, text, or other similar electronic communication, and so on. A renderable content data object 114 may invite a user associated with a target client 108a-108n to click a button, open a link, respond to a text or email, purchase a product, or otherwise respond to the electronic communication.

In some embodiments, a renderable content data object 114 may comprise one or more variable interactive action characteristics. Variable interactive action characteristics are one or more characteristics of a content data object that may be adjusted based on the intended target client 108a-108n of the renderable content data object 114. For example, a renderable content data object 114 may include a discount percentage, a voucher amount, a re-use limit, or other similar variable characteristic. In one specific example, a renderable content data object 114 may include a discount percentage on a certain product (e.g., 20% off the product). In another specific example, a renderable content data object 114 may include a voucher amount (e.g., $20 to spend at a particular location). In another specific example, a renderable content data object 114 may include a re-use limit (e.g., limit 5 per customer). One or more of the variable interactive action characteristics may be adjusted based on the target client 108a-108n and determinations of the content generation framework 102.

As further depicted in FIG. 1, the example content generation framework 102 is further configured to receive interaction data signals 116. Interaction data signals 116 refer to one or more data objects or set of data objects indicating characteristics related to the responsive action executed by the target client 108a-108n receiving the renderable content data object 114. For example, interaction data signals 116 may comprise a data object including indicators of the responsive action taken by the target client 108a-108n. Interaction data signals 116 may indicate whether a renderable content data object 114 was viewed, or otherwise interacted with. Interaction data signals 116 may indicate whether a link was clicked, an item was purchased, a coupon or voucher was redeemed, or other similar data. Interaction data signals 116 may further include further characteristics of the responsive action, for example, the duration of the responsive action, the input method (e.g., touch, click, voice, etc.) of the responsive action, the electronic device type (e.g., laptop, phone, voice service, etc.) used to interact with the renderable content data object 114, and so on.

As further depicted in FIG. 1, the example content generation framework 102 includes a network 106. The network 106 can be a communications network and/or can be configurable to be embodied in any of a myriad of network configurations. In some embodiments, the network 106 embodies a public network (e.g., the Internet). In some embodiments, the network 106 embodies a private network (e.g., an internal, localized, or closed-off network between particular devices). In some other embodiments, the network 106 embodies a hybrid network (e.g., a network enabling internal communication between particular connected devices and external communication with other devices). The network 106 in some embodiments includes one or more base station(s), relay(s), router(s), switch(es), cell tower(s), communications cable(s) and/or associated routing station(s), and/or the like. In some embodiments, the network 106 includes one or more computing device(s) controlled by individual entities (e.g., an entity-owner router and/or modem) and/or one or more external utility devices (e.g., Internet service provider communication tower(s) and/or other device(s)).

The computing devices of the autonomous content generation system 100 may each communicate in whole or in part over a portion of one or more communication network(s), such as the network 106. For example, each of the components of the autonomous content generation system 100 can be communicatively coupled to transmit data to and/or receive data from one another over the same and/or different wireless or wired networks embodying the network 106. Non-limiting examples of network configuration(s) for the network 106 include, without limitation, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities communicating over the communications network(s), the various embodiments are not limited to this particular architecture. In other embodiments, one or more computing entities share one or more components, hardware, and/or the like, or otherwise are embodied by a single computing device such that connection(s) between the computing entities are altered and/or rendered unnecessary. Alternatively, or additionally still, in some embodiments the network 106 enables communication to one or more other computing device(s) not depicted, for example client device(s) for accessing functionality of any of the subsystems therein via native and/or web-based application(s), and/or the like.

As further depicted in FIG. 1, the example content generation framework 102 is configured to receive a user experience content dataset 110. A user experience content dataset 110 refers to one or more data structures mapping one or more features or characteristics of a target client 108a-108n to one or more responsive actions performed by the target client. A user experience content dataset 110 is configured to store the characteristics of a target client 108a-108n including demographic data and status characteristics, as described herein. The user experience content dataset 110 further includes responsive actions logged by the target client 108a-108n including, for example, interaction data signals 116. In some embodiments, the responsive actions of the target client 108a-108n may be associated with a particular renderable content data object 114 presented to the target client 108a-108n.

Figure 8:
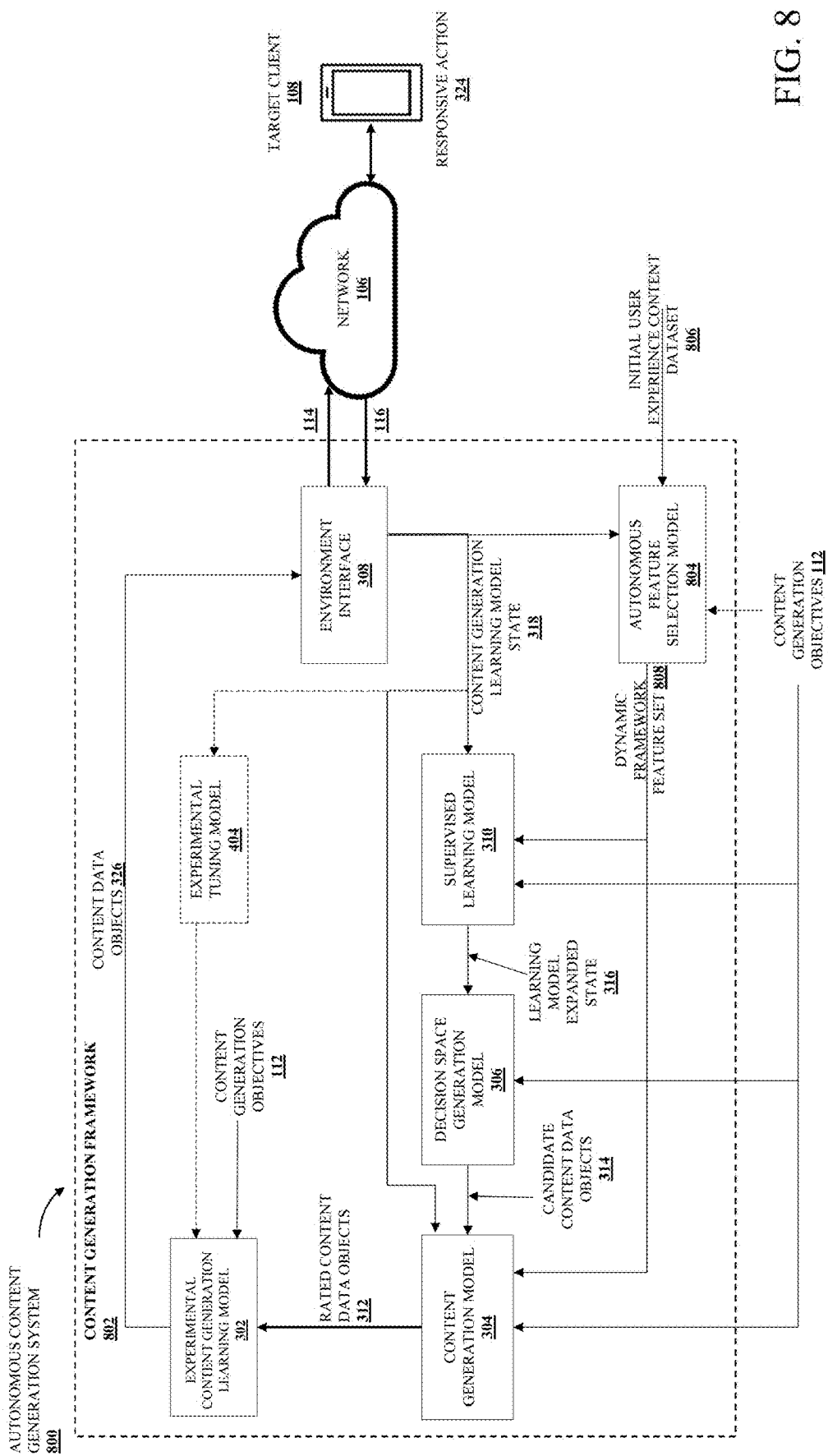
FIG. 8 illustrates a block diagram of an example autonomous content generation system comprising an autonomous feature selection model in accordance with an example embodiment of the present disclosure.

In some embodiments, a user experience content dataset 110 may comprise an initial user experience content dataset (e.g., initial user experience content dataset 806 described in relation to FIG. 8). An initial user experience content dataset may comprise target client 108a-108n data including historical characteristic data captured previous to the launch of the content generation framework 102. In some examples, an initial user experience content dataset may comprise characteristics of the target client 108a-108n such as demographic data and status characteristics but may not include responsive actions or interaction data signals 116 captured in response to a renderable content data object 114.

In some embodiments, a user experience content dataset 110 may comprise a feedback user experience content dataset. A feedback user experience content dataset may comprise updated target client 108a-108n data including responsive actions and interaction data signals 116 in response to a renderable content data object 114 provided to the target client 108a-108n. A feedback user experience content dataset may be leveraged to define the current state of the autonomous content generation system 100, including the state of an associated target client 108a-108n. A feedback user experience content dataset may further be leveraged to update one or more machine learning models comprising the content generation framework 102. In some embodiments, the feedback user experience content dataset may be leveraged to define the features used by one or more machine learning models, for example, a dynamic framework feature set (e.g., dynamic framework feature set 808) as described in relation to FIG. 8).

As further depicted in FIG. 1, the example content generation framework 102 is configured to receive content generation objectives 112. Content generation objectives 112 include quantifiable parameters utilized by components of the content generation framework 102 to measure the operation of the content generation framework 102. For example, quantifiable client parameters may be included in one or more content generation objectives 112 received at the content generation framework 102. Client parameters may include target client churn (e.g., the number or percent of users associated with target clients 108a-108n who cease interaction with the content generation framework 102 or associated vendor). Other client parameters may include parameters related spending by users associated with a target client 108a-108n, such as user spending over a period of time, total user spending, user spending trends, user checkout frequency, speed of user checkouts, and so on; return-on-investment (ROI); parameters related to customer retention, such as churn rates, customer purchase frequency, average customer duration, and so on.

The primary objectives of the content generation framework 102 may be included in the content generation objectives 112. For example, a system or computing device may indicate return on investment as a primary objective through one or more content generation objectives 112. In such an instance, one or more machine learning models comprising the content generation framework 102 may be tuned to maximize the return on investment based on the renderable content data objects 114. Similarly, customer churn may be indicated as a primary objective through one or more content generation objectives 112. In such an instance, one or more machine learning models comprising the content generation framework 102 may be tuned to minimize the customer churn based on the received renderable content data objects 114.

In some embodiments, multiple primary objectives and/or multiple secondary objectives may be provided by the content generation objectives 112. In such an instance, the multiple primary objectives and/or multiple secondary objectives may further include weights and/or priorities, indicating a priority of objectives of the content generation framework 102.

The content generation objectives 112 of the autonomous content generation system 100 may further include one or more characteristic ranges and/or one or more characteristic step limitations. Characteristic ranges provide limitations and/or guardrails on the parameters of a content data object (e.g., renderable content data object 114). For example, the characteristic ranges of a content generation objective 112 may provide a range of acceptable values of one or more variable interactive action characteristics of a content data object. Similarly, content generation objectives 112 may define a characteristic step limitation for one or more variable interactive action characteristics of a content data object. A characteristic step limitation may be a maximum step size for a variable interactive action characteristics over a defined period. For example, a content generation objective 112, may indicate a voucher amount has a maximum step size of 10% per iteration. Thus, the voucher amount may move up or down only 10% for each iteration of renderable content data object 114 presented to the target client 108a-108n.

Content generation objectives 112 may be provided and updated manually or automatically. For example, a vendor may manually input content generation objectives 112 via a terminal to the content generation framework 102. One or more of the content generation objectives 112 may further be provided or updated automatically. For example, based on the manually provided content generation objectives 112, based on industry norms or standards, based on vendor provided parameters, or other similar parameters.

Example Apparatus

Figure 2:
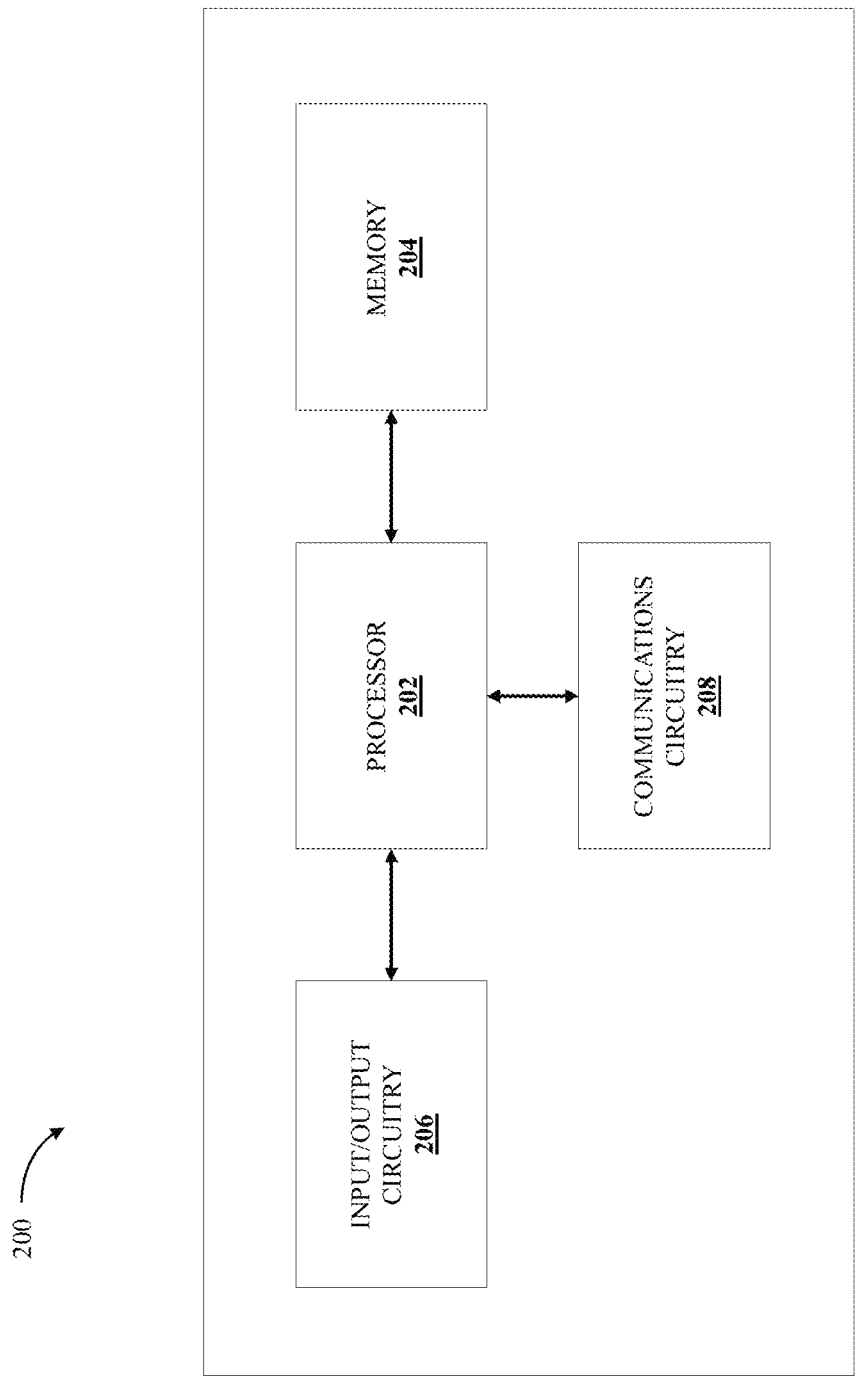
FIG. 2 illustrates a block diagram of an example apparatus that can be specially configured in accordance with an example embodiment of the present disclosure.

FIG. 2 illustrates a block diagram of an example apparatus 200 that can be specially configured in accordance with at least one example embodiment of the present disclosure. Specifically, FIG. 2 illustrates the content generation framework 102 apparatus in accordance with at least one example embodiment of the present disclosure. The content generation framework 102 apparatus includes processor 202, memory 204, input/output circuitry 206, and communications circuitry 208. In some embodiments, the content generation framework 102 apparatus is configured, using one or more of the sets of circuitry 202, 204, 206, and/or 208, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the content generation framework 102 apparatus embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the content generation framework 102 apparatus provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the content generation framework 102 apparatus. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the content generation framework 102 apparatus to carry out various functions in accordance with example embodiments of the present disclosure.

The processor 202 can be embodied in a number of different ways. For example, in some example embodiments, the processor 202 includes one or more processing devices configured to perform independently. Additionally, or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the content generation framework 102 apparatus, and/or one or more remote or "cloud" processor(s) external to the content generation framework 102 apparatus.

In an example embodiment, the processor 202 is configured to execute instructions stored in the memory 204 or otherwise accessible to the processor. Alternatively, or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively, or additionally, as another example in some example embodiments, when the processor 202 is embodied as an executor of software instructions, the instructions specifically configure the processor 202 to perform the algorithms embodied in the specific operations described herein when such instructions are executed. In some embodiments, the processor 202 includes or is embodied by a CPU, microprocessor, and/or the like that executes computer-coded instructions, for example stored via the non-transitory memory 204.

In some embodiments, the content generation framework 102 apparatus includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as an electronic interface, a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor can be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes hardware, software, firmware, and/or a combination thereof, that facilitates simultaneously display of particular data via a plurality of different devices.

In some embodiments, the content generation framework 102 apparatus includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the content generation framework 102 apparatus. In this regard, in some embodiments the communications circuitry 208 includes, for example, a network interface for enabling communications with a wired or wireless communications network. Additionally, or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the content generation framework 102 apparatus.

Additionally, or alternatively, in some embodiments, two or more of the sets of circuitries 202-208 are combinable. Alternatively, or additionally, in some embodiments, one or more of the sets of circuitry perform some or all of the functionality described associated with another component. For example, in some embodiments, two or more of the sets of circuitry 202-208 are combined into a single module embodied in hardware, software, firmware, and/or a combination thereof. Similarly, in some embodiments, one or more of the sets of circuitry, is/are combined with the processor 202, such that the processor 202 performs one or more of the operations described above with respect to each of these sets of circuitry 204-208.

Example Operations

Figure 3:
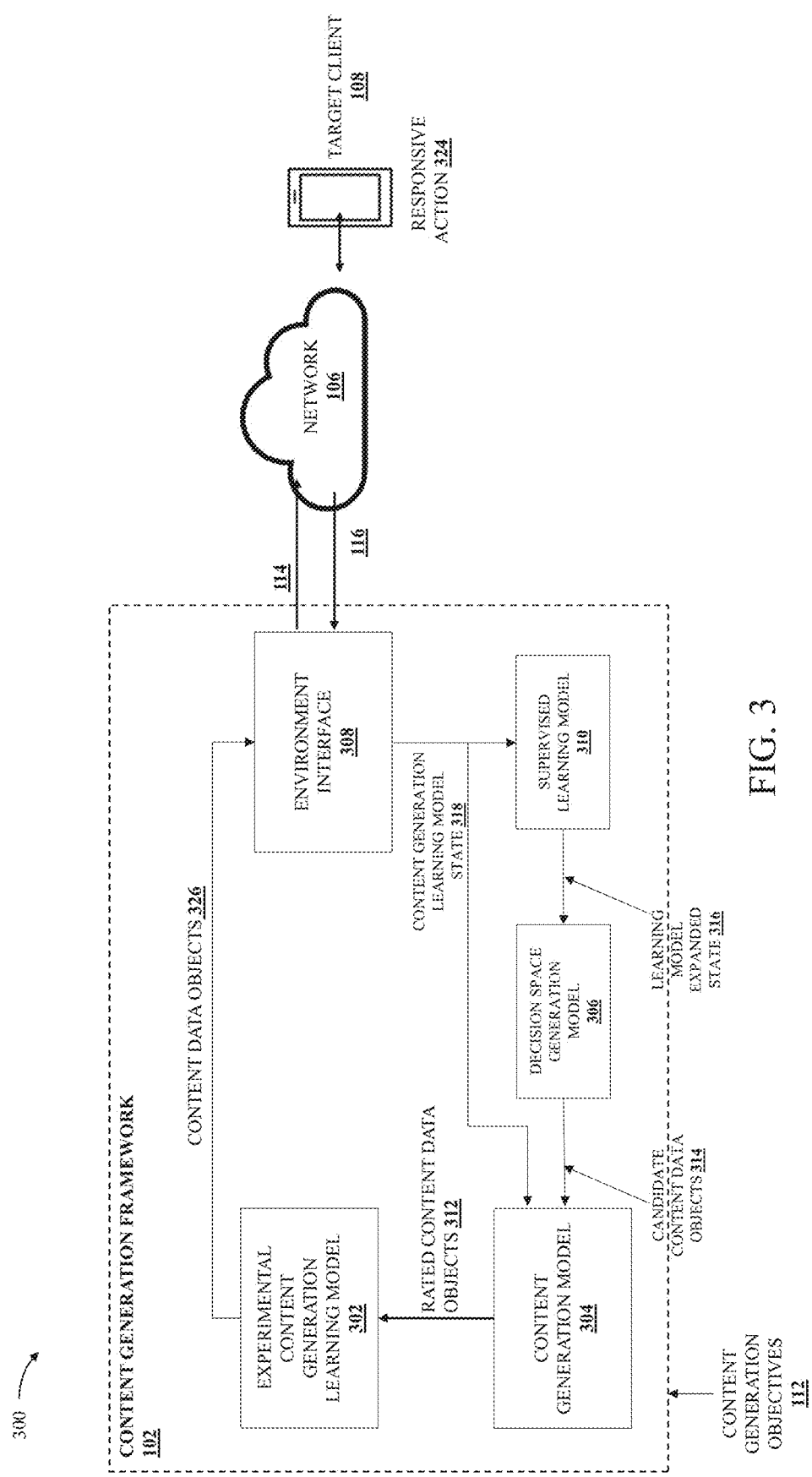
FIG. 3 illustrates a block diagram of an example content generation framework within an autonomous content generation system in accordance with an example embodiment of the present disclosure.

Referring now to FIG. 3, a block diagram of an example content generation framework 102 is provided. As depicted in FIG. 3, the content generation framework 102 is configured to generate renderable content data objects 114 to be presented to a target client 108 communicatively connected through a network 106. The content generation framework 102 is further configured to receive interaction data signals 116 from a target client 108 based at least in part on one or more responsive actions 324 taken by the target client 108 in response to the renderable content data object 114.

As further depicted in FIG. 3, the content generation framework 102 includes a decision space generation model 306. A decision space generation model 306 is configured to receive or access a learning model expanded state 316 associated with the target client 108 and generate one or more candidate content data objects 314 based at least in part on the learning model expanded state 316 and the content generation objectives 112. The candidate content data objects 314 refer to any set of one or more content data objects that may be presented to a target client 108 to illicit a responsive action 324. Candidate content data objects 314 are generated in compliance with the content generation objectives 112, including characteristic ranges.

In some embodiments, the candidate content data objects 314 may include a plurality of content data objects intended to be distributed throughout the decision space of the content data objects. For example, a content data object may include one or more variable interactive action characteristics. The variable interactive action characteristics may be subject to a characteristic range. The decision space may include the full breadth of possible combinations of variable interactive action characteristics of a content data object for the target client 108. The decision space generation model 306 may vary the content data objects comprising the candidate content data object 314 to be distributed within the decision space for the target client 108. The decision space generation model 306 is described further in relation to FIG. 7.

As further depicted in FIG. 3, the content generation model 304 is configured to receive or access the candidate content data objects 314 and generate a set of rated content data objects 312. The rated content data objects 312 is a set of one or more content data objects from the candidate content data objects 314 that have been ranked, scored, or otherwise rated based on one or more content generation objectives 112.

In some embodiments, each content data object of the rated content data objects 312 may include a content data object score. A content data object score is any quantification of a content data object relative to the likelihood of inducing a particular responsive action 324 by a target client 108 or a user associated with the target client 108. A content data object score may be represented by a percentage, a normalized score, a probability, or any other quantification. A highest content data object score corresponds with a content data object score for a rated content data object 312 most likely to illicit responsive action in accordance with one or more content generation objectives 112.

In some embodiments, each content data object of the rated content data objects 312 may include a content data object confidence value. A content data object confidence value is any quantification of a confidence that the content data object score accurately represents the target client 108 and anticipated responsive action 324. In general, a content data object confidence may be dependent on the data available to a content generation framework 102. For example, a content data object confidence based on very little data related to a specific target client 108 may be relatively low. However, a content data object confidence with access to a long history and significant data related to a specific target client 108 may be relatively high.

In some embodiments, each content data object of the rated content data objects 312 may include a content data object rank. A content data object rank is any arrangement of the candidate content data objects 314 according to a predicted outcome of a client parameter as provided in the content generation objectives 112. For example, in an instance in which the content generation framework 102 is configured to maximize ROI based on the content generation objectives 112, the content data object rank may correspond to a ranking relative to the other candidate content data objects 314 based on a predicted ROI. A content data object rank may be based on the content data object score, the content data object confidence, or both. A highest content data object rank corresponds with a content data object rank for a rated content data object 312 most likely to illicit responsive action in accordance with one or more content generation objectives 112. The content generation model 304 is further described in relation to FIG. 6.

As further depicted in FIG. 3, the example content generation framework 102 includes an experimental content generation learning model 302 configured to receive or access the rated content data objects 312 and output one or more content data objects 326 based on an experimental classification group assigned to the particular content data object 326 intended for the target client 108. As described further in relation to FIG. 5, the content data object 326 is selected based on an experimental classification group to optimize one or more content generation objectives 112 over the operation of the content generation framework 102.

As further depicted in FIG. 3, the example content generation framework 102 includes an environment interface 308 configured to transmit renderable content data objects 114 and receive interaction data signals 116. Although depicted as a single interface in FIG. 3, the environment interface 308 may be configured as a plurality of interfaces, for example a separate environment interface 308 for transmitting renderable content data objects 114 and for received interaction data signals 116. In some embodiments, the environment interface 308 may include hardware and/or software to transmit data objects and associated content to produce a renderable content data object 114. A renderable content data object 114 may include additional data including graphic, notification, communication, or other data necessary to render the content data object on a target client 108. In some embodiments, the renderable content data object 114 may be equivalent to the content data object 326. Further, in some embodiments, the renderable content data object 114 may be transmitted directly by the experimental content generation learning model 302.

As further depicted in FIG. 3, the environment interface 308 is configured to generate a content generation learning model state 318 based on the interaction data signals 116 received from the target client 108. The content generation learning model state 318 refers to one or more data constructs representing the current state of the target client 108 for which the renderable content data object 114 has been provided. The content generation learning model state 318 may include updated characteristics of the target client 108, such as demographic data and/or status data. The content generation learning model state 318 may also include recent and historical responsive actions 324 by the target client 108 in response to received renderable content data objects 114. In addition, the content generation learning model state 318 may include reward data quantifying the outcome of the renderable content data object 114 with respect to one or more objectives identified by the content generation objectives 112. The content generation learning model state 318 may be leveraged to update one or more machine learning models in the content generation framework 102. For example, the supervised learning model 310, the decision space generation model 306, the content generation model 304, and the experimental content generation learning model 302, among others.

As further depicted in FIG. 3, the example content generation framework 102 includes a supervised learning model 310. The supervised learning model 310 is configured to receive the content generation learning model state 318 and generate a learning model expanded state 316 based on the content generation learning model state 318. The learning model expanded state 316 refers to one or more data constructs representing the state of the target client 108, including determined expanded state characteristics of the target client 108 based on the content generation learning model state 318. For example, a supervised learning model 310 may include a machine learning model configured to determine expanded state characteristics of the target client 108 based on the content generation learning model state 318. For example, expanded state characteristics may include the likelihood of churn of a user associated with a target client 108. The supervised learning model 310 is described further in relation to FIG. 9.

Figure 4:
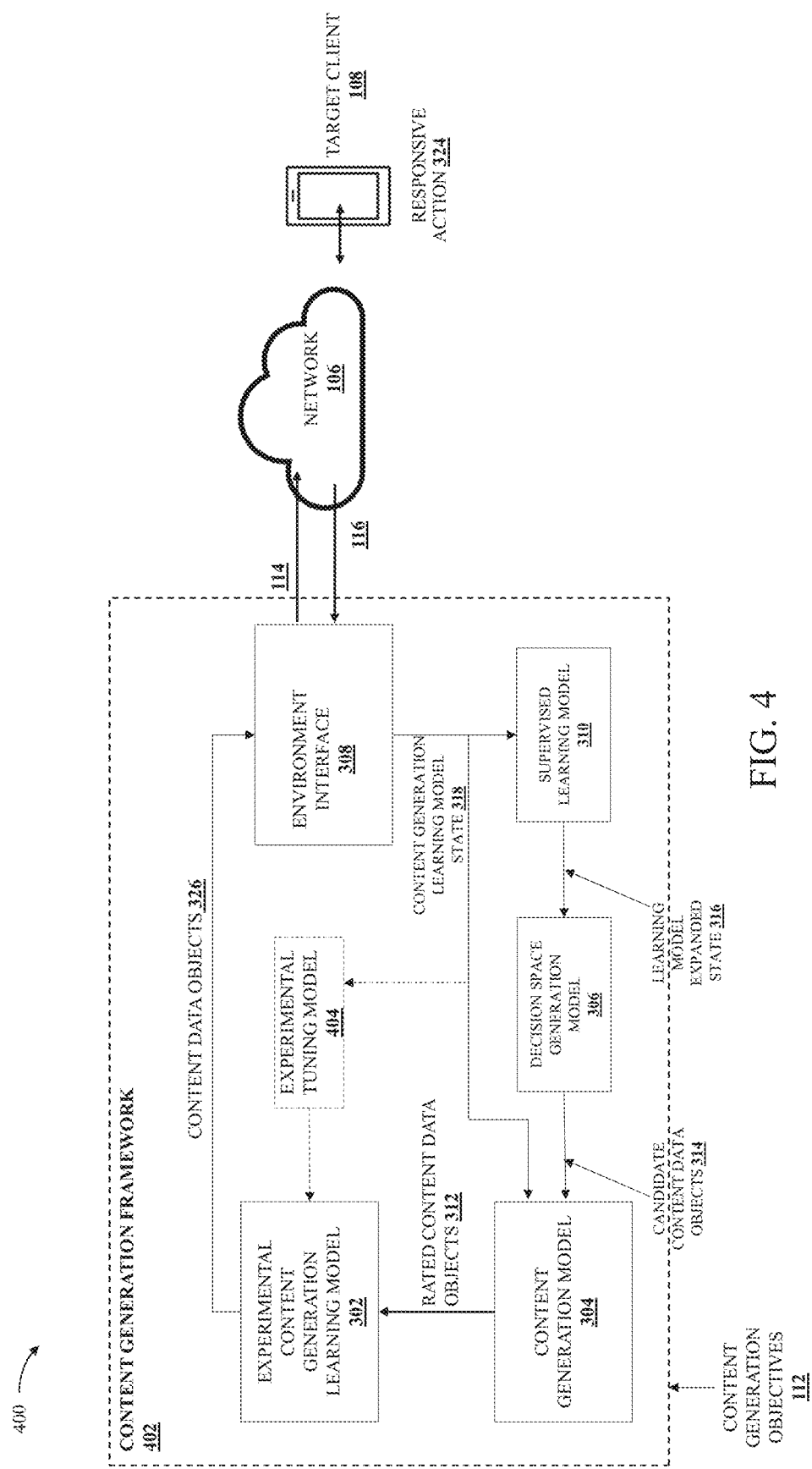
FIG. 4 illustrates a block diagram of an example content generation framework comprising an experimental tuning model in accordance with an example embodiment of the present disclosure.

Referring now to FIG. 4, an example autonomous content generation system 400 including a content generation framework 402 is provided. As depicted in FIG. 4, the example content generation framework 402 is configured to generate renderable content data objects 114 and present the renderable content data objects 114 to a target client 108 via an environment interface 308 interacting with a network 106. The example content generation framework 402 is further configured to receive or access interaction data signals 116 at the environment interface 308 indicative of one or more responsive actions 324 taken by the target client 108. As further depicted in FIG. 4, the content generation framework 402 further includes a supervised learning model 310 configured to access a content generation learning model state 318 generated by the environment interface 308 and generate a learning model expanded state 316. The decision space generation model 306 accesses the learning model expanded state 316 and generates candidate content data objects 314. As further depicted in FIG. 4, the content generation model 304 accesses the candidate content data objects 314 and generates rated content data objects 312 based at least in part on the candidate content data objects 314 and content generation objectives 112. The experimental content generation learning model 302 leverages the rated content data objects 312 to generate one or more content data objects 326 for the target client 108.

As depicted in FIG. 4, the example content generation framework 402 includes an experimental tuning model 404. The experimental tuning model 404 refers to one or more machine learning models configured to access the content generation learning model state 318, including interactive data signals 116, and adjust the selected content data object 326 selected by the experimental content generation learning model 302 based on a learning-based objective. A learning-based objective refers to one or more objectives specified within the content generation objectives 112, the determination of which is enhanced by the output of a learning model (e.g., experimental tuning model 404). Learning-based objectives may include the determination of an optimal content data object when a plurality of primary objectives are indicated. Learning-based objectives may further include the determination of a content data object based on enhancing the confidence generated by a content generation model.

In some embodiments, the experimental tuning model 404 may leverage one or more machine learning models to select an optimal rated content data object as the content data object 326 in an instance in which a plurality of primary objectives are indicated by the content generation objectives 112. For example, in some embodiments, the content generation model 304 may generate rated content data objects 312 comprising a plurality of content data object scores and the content generation objectives 112 may indicate a plurality of primary objectives and/or a plurality of secondary objectives. In such an instance, the experimental content generation learning model 302 may leverage the experimental tuning model 404 and associated machine learning models to determine an optimal rated content data object of the rated content data objects 312 based on the content generation objectives 112 and the content generation learning model state 318. The optimal rated content data object may represent the content data object optimally fulfilling the plurality of objectives based on the predicted content data object scores and/or content data object ranks determined by the content generation model.

In some embodiments, the experimental tuning model 404 may leverage one or more machine learning models to select a confidence enhancing content data object from the plurality of rated content data objects 312 to be selected as the content data object 326 and transmitted as a renderable content data object 114 to the target client 108. A confidence enhancing content data object refers to one or more content data objects selected based on a likelihood that a content data object confidence value associated with a target client 108 or set of target clients 108 may increase. For example, in some embodiments, certain areas of the decision space may be unexplored and may include a large uncertainty. Uncertainty in a certain area of the decision space may result in low confidence values associated with rated content data object 312 in those portions of the decision space. In some embodiments, a rated content data object 312 may be selected to optimize the information learned from transmitting the content data object 326 to the target client 108 and observing the responsive action 324 of the target client 108. The experimental tuning model 404 and associated learning models may determine the rated content data object 312 optimizing the return of information, thus improving subsequent confidence scores associated with the decision space for the target client 108 and similarly situated target clients 108.

Figure 5:
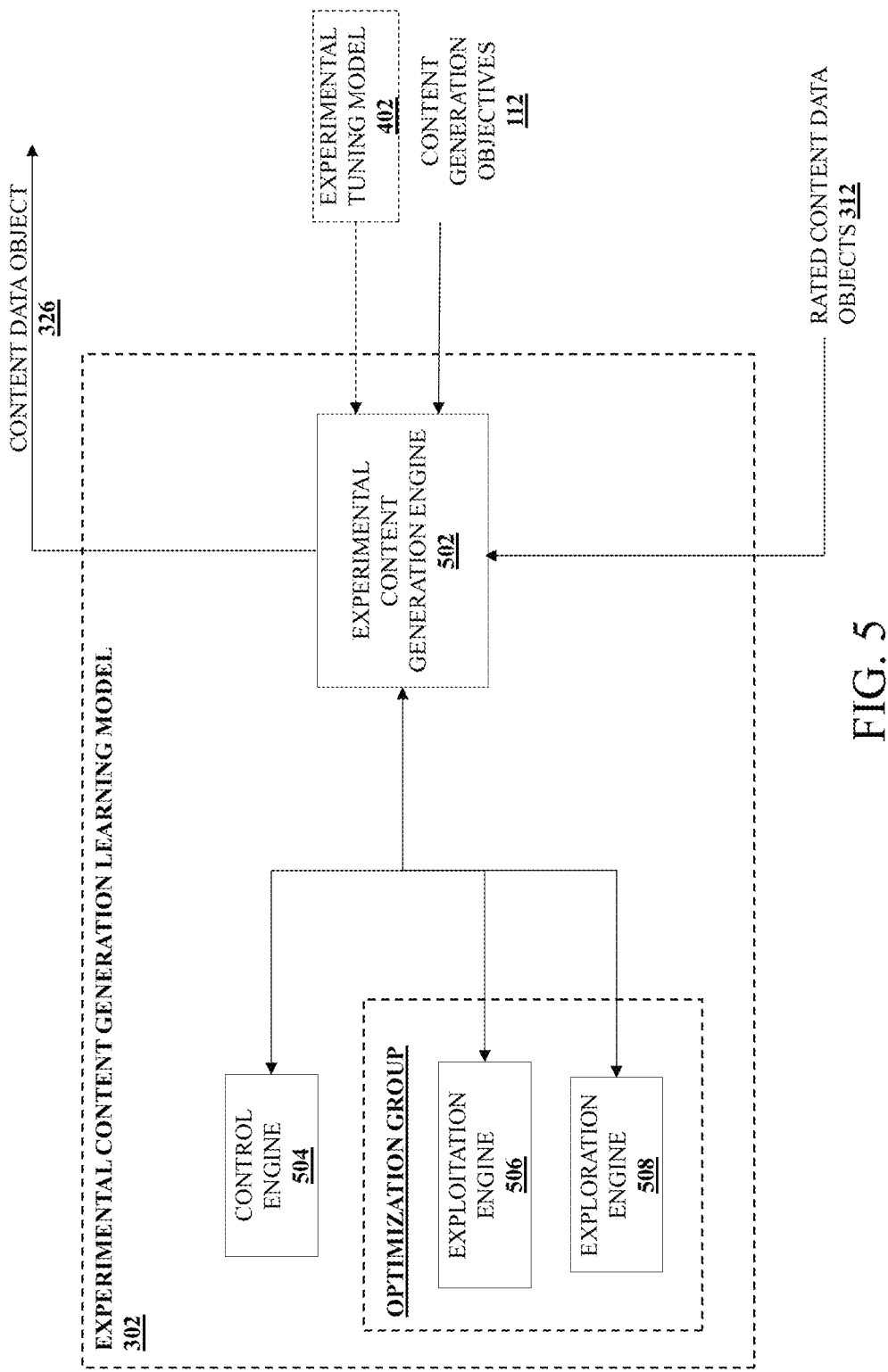
FIG. 5 illustrates a block diagram of an example experimental content generation learning model within a content generation framework in accordance with an example embodiment of the present disclosure.

Referring now to FIG. 5, an example experimental content generation learning model 302 is provided. As depicted in FIG. 5, the example experimental content generation learning model 302 includes an experimental content generation engine 502 configured to access rated content data objects 312 and content generation objectives 112 and generate a content data object 326. As further depicted in FIG. 5, the example experimental content generation learning model 302 includes a control engine 504, an exploitation engine 506, and an exploration engine 508, each configured to adjust the output of the experimental content generation learning model 302 based on the experimental classification group determined for the content data object 326. In some embodiments, the experimental content generation learning model 302 may further receive input from an experimental tuning model 404 configured to inform the selection of the content data object from the plurality of rated content data objects 312 based on a machine learning model.

As depicted in FIG. 5, the example experimental content generation learning model 302 includes an experimental content generation engine 502. An experimental content generation engine 502 refers to hardware and/or software configured to determine a content data object 326 for a target client (e.g., target client 108) from a plurality of rated content data objects 312 based on an experimental classification group. In some embodiments, the experimental content generation engine 502 may utilize one or more machine learning models to determine the experimental classification group informing the selection of the content data object 326 and/or select the content data object 326 from the rated content data objects 312 based on one or more content generation objectives 112. Leveraging a machine learning model, an experimental content generation engine 502 may select a content data object 326 based on more complex objectives. For example, multiple primary objectives and/or selection of a content data object 326 intended to enhance the performance of the content generation framework. In some embodiments, the experimental content generation learning model 302 may determine the experimental classification group and content data object 326 based on standard algorithms without utilizing a machine learning model.

A content generation framework (e.g., content generation framework 102, 402) utilizes one or more machine learning models to generate a content data object 326 suited to illicit a desired responsive action from a target client based on the content generation learning model state (e.g., content generation learning model state 318) associated with the target client. Learning models may require significant amounts of data, including historical data, related to the target client and/or similarly situated target clients in order to accurately determine the responsive action of the target client when presented with a particular renderable content data object (e.g., renderable content data object 114). To rapidly improve the accuracy of the content generation framework, particularly in a data-constrained environment, the experimental content generation learning model 302 programmatically determines an experimental classification group for each content data object 326 and selects the content data object 326 based on the classification group. By determining the content data object 326 based on classification group, the experimental content generation learning model 302 may more efficiently explore the decision space for a target client. In addition, the experimental content generation learning model 302 may maximize the information learned from each selected content data object 326 and the subsequent content generation learning model state based on the responsive action of the target client.

As depicted in FIG. 5, the experimental content generation engine 502 utilizes a plurality of content generation engines (e.g., control engine 504, exploitation engine 506, exploration engine 508) to determine a content data object 326 based on the experimental classification group of the content data object 326. In some embodiments, the experimental classification group may be determined by the experimental content generation engine 502, however, the experimental classification group determination is not limited to the experimental content generation learning model 302 but may be determined at other electrical components of the content generation framework.

The experimental classification group refers to one or more labels, classifications, or similar identifiers assigned to a content data object received at the experimental content generation learning model 302. The experimental classification group for a particular iteration may be determined based on a number of factors. For example, the experimental classification group for a content data object 326 may be determined based on the target client, the content generation learning model state, specified content generation objectives 112, based on the output of a machine learning model, and so on. In some embodiments, a distribution of content data objects 326 among the experimental classification groups may be determined by content generation objectives 112 or based on the output of a machine learning model configured to determine an experimental classification group distribution. For example, an experimental classification group distribution may indicate 60% of the content data objects 326 are assigned to the control classification group, 20% are assigned to the exploitation classification group, and 20% are assigned to the exploration classification group. Thus, as content data objects 326 are generated and transmitted, the experimental content generation engine 502 may utilize a mechanism to ensure content data objects 326 are distributed according to the determined experimental classification group distribution.

As further depicted in FIG. 5, the experimental content generation learning model 302 includes a control engine 504 configured to generate content data objects 326 in accordance with a control group framework. In some embodiments, one or more content data objects may be associated with a control group. A control group is any group content data objects associated with a target client, group of rated content data objects 312, and/or any other grouping of content data objects for which the content data object 326 is selected in accordance with the control group framework. In such an embodiment, the selected content data object 326 is determined based on a control group framework implemented by the control engine 504.

The control group framework refers to one or more policies, models, algorithms, or processes configured to act in accordance with an established standard of the content generation framework to generate a control content data object. An established standard may be any policy, model, algorithm, process, etc. by which a content generation framework has traditionally generated content data objects or otherwise generates content data objects according to one or more pre-determined or otherwise established processes. An established standard may include a heuristic method defined by a vendor. Such a heuristic method may generate a content data object based on determinations of the target client characteristics. A control content data object comprises the content data object determined by the control group framework.

In some embodiments, an established standard may include a previous iteration of one or more components of the content generation framework. In such an embodiment, the established standard may generate the control content data object based on the hyperparameters and features utilized by the associated learning models. The control group framework utilizes the content data object returned by the established standard as the control content data object for the control group.

As further depicted in FIG. 5, the experimental content generation learning model 302 may include an exploitation engine 506 configured to generate content data objects 326 in accordance with an exploitation group framework. In some embodiments, one or more content data objects may be associated with an exploitation group. An exploitation group refers to one or more content data objects associated with a target client, one or more rated content data objects 312, and/or any other grouping of one or more content data objects for which the content data object 326 is selected in accordance with an exploitation group framework. An exploitation group framework refers to one or more policies, models, algorithms, or processes that exploit the content data object rank and/or content data object score determined for the target client by the content generation model (e.g., content generation model 304). In some embodiments the content generation model may generate a plurality of rated content data objects 312 comprising a content data object rank and/or content data object score based on the content generation learning model state of the target client and one or more content generation objectives 112. The generated content data object or the content generated object with the highest content data object score and/or content data object rank (e.g., a content data object predicted to have a best within the guardrails and/or other requirements of the model) may be selected as the content data object 326 to be presented to the target client under an exploitation group framework.

In some embodiments, characteristic step limitations may be provided for a particular variable interactive action characteristic of a content data object. A characteristic step limitation may include a maximum step size for a variable interactive action characteristics over a defined period. Characteristic step limitations may be provided by a vendor, for example, through a content generation objective 112, or otherwise configured in the content generation framework.

Characteristic step limitations may limit the volatility of content data objects 326 provided to the target client. For example, the content data object associated with the highest content data object rank and/or highest content data object score may exceed the characteristic step limitations for one or more variable interactive action characteristics. In some embodiments, the exploitation group framework may adjust the one or more offending variable interactive action characteristics such that the one or more offending variable interactive action characteristics is within the characteristic step limitation.

For example, a voucher may have a variable interactive action characteristic associated with a dollar value. The dollar value may have a characteristic step limitation of $20. In an example instance, the content data object associated with the highest content data object rank and/or highest content data object score may have a voucher dollar value of $120, where the previous content data object presented to the target client had a voucher dollar value of $80. Presenting the content data object associated with the highest content data object rank and/or highest content data object score would increase the dollar value of the voucher by $40, exceeding the characteristic step limitation ($20) for the variable interactive action characteristic. In such an instance, the exploitation group framework may reduce the dollar value of the voucher to $100 such that the change in the variable interactive action characteristic is within the characteristic step limitations.

Characteristic step limitations may vary based on the target client, for example, an established existing customer associated with a target client may be subject to small characteristic step limitations, while a potential customer or new customer may be configured to receive content data objects in accordance with larger characteristic step limitations. The exploitation group framework may adjust variable interactive action characteristics in accordance with the characteristic step limitations and/or select a control content data object with variable interactive action characteristics within the characteristic step limitations.

As further depicted in FIG. 5, the experimental content generation learning model 302 includes an exploration engine 508 configured to generate content data objects 326 in accordance with an exploration group framework. In some embodiments, one or more content data objects may be associated with an exploration group. An exploration group refers to one or more content data objects associated with a target client, one or more rated content data objects 312, and/or any other grouping of one or more content data objects for which the content data object 326 is selected in accordance with an exploration group framework. An exploration group framework refers to one or more policies, models, algorithms, or processes that explores certain aspects of the decision space using rules that may differ from the exploitation group, which may facilitate future improvement of the model as a whole. In some embodiments, the predicted outcome based on the content data object rank and/or content data object score may or may not be predicted to yield an optimal output, may be designed to yield a higher amount of learning for future decision making, and/or is in violation of a characteristic step limitation. For example, in some embodiments, a non-optimal content data object may be selected based on the information that may be received from an interaction of the target client with the renderable content data object generated based on the selected content data object. In some embodiments, the selection of the content data object 326 based on the exploration group framework may be based on a random input. A random input refers to one or more data constructs, variables, or other parameters comprising a random or pseudo-random component. For example, a random input may be a numeric value generated by a pseudo-random generator. In some embodiments, a random content data object may be selected from the rated content data objects 312 based on the random input. In some embodiments, a random content data object associated with a region of the decision space may be selected. In some embodiments, the exploration group framework may ignore one or more characteristic step limitations. Ignoring characteristic step limitations for a subset of generation content data objects 326 may increase the speed at which the decision space may be navigated and lead to more accurate results from the content generation framework in fewer iterations.

In some embodiments, input from an experimental tuning model 404 may be leveraged to select a content data object from the rated content data objects 312. By designating a portion of the content data objects 326 provided to the target clients based on an exploration group framework, the accuracy of the content generation framework may be significantly improved. For example, portions of the decision space that may otherwise be unexplored may be uncovered based on the exploration group framework and more optimal results may be uncovered.

Figure 6:
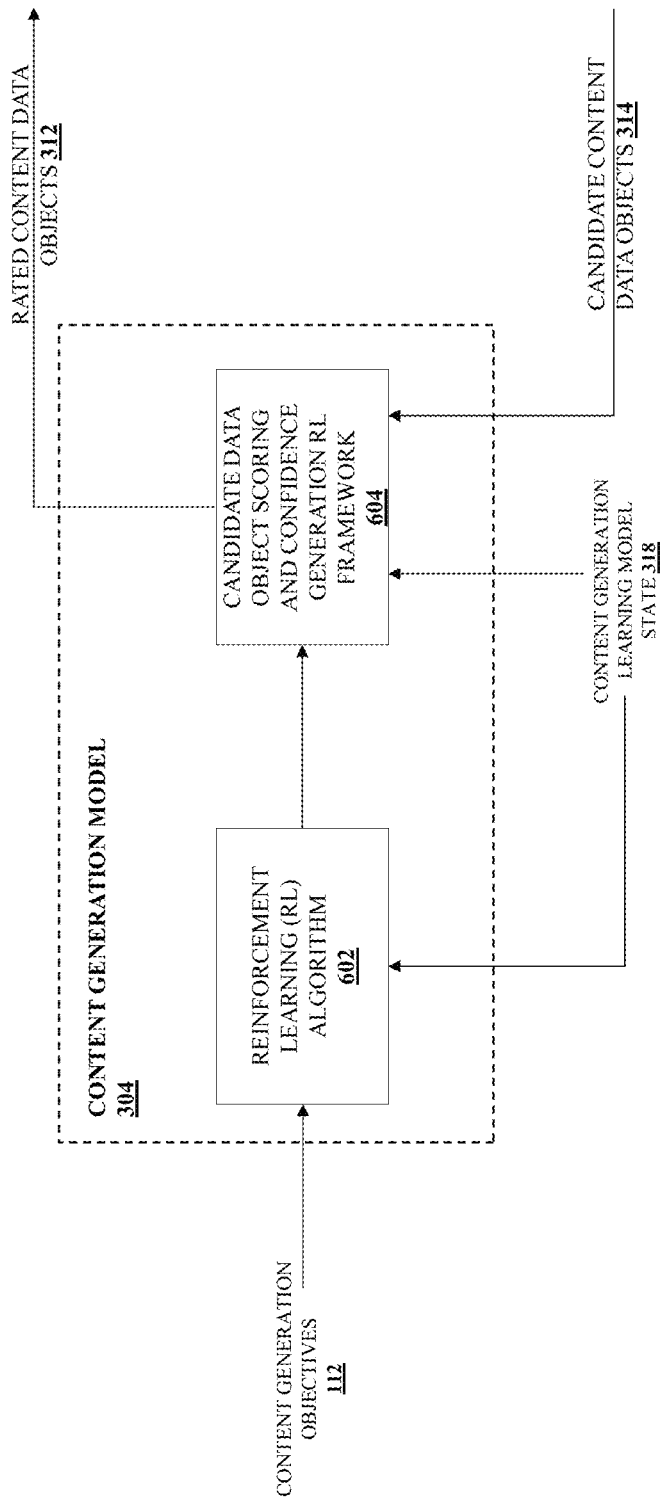
FIG. 6 illustrates a block diagram of an example content generation model within a content generation framework in accordance with an example embodiment of the present disclosure.

Referring now to FIG. 6, an example content generation model 304 is provided. As depicted in FIG. 6, the example content generation model 304 includes a reinforcement learning (RL) algorithm 602 configured to update a candidate data object scoring and confidence generation RL framework 604 based on the content generation learning model state 318.

As depicted in FIG. 6, the example content generation model 304 is configured to utilize an RL model to generate rated content data objects 312 scored and/or ranked based on one or more objectives provided in the content generation objectives 112. The content generation model 304 utilizes a candidate data object scoring and confidence generation RL framework 604 to determine content data object ranks, content data object scores, and/or confidence values for each content data object in the set of candidate content data objects 314. The candidate content data objects 314 and associated content data object ranks, content data object scores, and/or confidence values may be stored as rated content data objects 312.

A goal of a reinforcement learning model (e.g., content generation model 304) may comprise configuring the candidate data object scoring and confidence generation RL framework 604 such that the selected content data objects presented to the target client maximizes a reward function. For example, a candidate data object scoring and confidence generation RL framework 604 may interface with its environment in discrete time steps, where at each time t, the candidate data object scoring and confidence generation RL framework 604 receives a current state $s_t$ and reward $r_t$ as contained in the content generation learning model state 318. The candidate data object scoring and confidence generation RL framework 604 may determine scoring, ranking, and confidence values for the candidate content data objects 314 and execute an action based on the scoring, ranking, and confidence values (e.g., select a rated content data object 312 for presentation to a target client based on the score and confidence), moving the task environment to a new state $s_{t+1}$ where a reward $r_{t+1}$ associated with a transition is determined based on the responsive actions of the target client. The reward is received at the RL algorithm 602 in the content generation learning model state 318 and compared with the primary objectives of the content generation objectives 112. The RL algorithm 602 utilizes a comparison of the reward $r_{t+1}$ and the reward $r_t$ along with the associated states $s_{t+1}$ and $s_t$, to determine adjustments to the candidate data object scoring and confidence generation RL framework 604. By continually updating the candidate data object scoring and confidence generation RL framework 604 based on the reward, the candidate data object scoring and confidence generation RL framework 604 may be trained to maximize the content object rank, content data object score, and/or confidence value associated with a candidate content data object 314 and the associated content generation learning model state 318.

In some embodiments, the content generation model 304 may utilize a hybrid reinforcement learning algorithm, such as a contextual bandits learning model, to determine the rated content data objects 312. Traditional RL algorithms may make predictions based on a plurality of future iterations. For example, a traditional RL algorithm may consider the predicted reward at time t+1, t+2, t+3, and so on. Predicting future rewards across multiple iterations and using those predictions to inform the current decision may lead to more predictable and consistent outcomes. However, such an approach may increase the time for a content generation model 304 to improve predicted outcomes. In an autonomous content generation system in which the time between iterations is long, a traditional RL algorithm may take too long to produce accurate results. A hybrid RL algorithm only considers the predicted reward of the next iteration of the content generation model 304. Thus, while predicted outcomes may be more erratic in the short term, the content generation model 304 may converge on accurate predicted outcomes within fewer iterations. As such, a hybrid RL algorithm may be preferred in an autonomous content generation system with long times between iterations. Although depicted as a reinforcement learning model in FIG. 6, a content generation model 304 may comprise one or more machine learning models, or other algorithms to generate rated content data objects 312.

Figure 7:
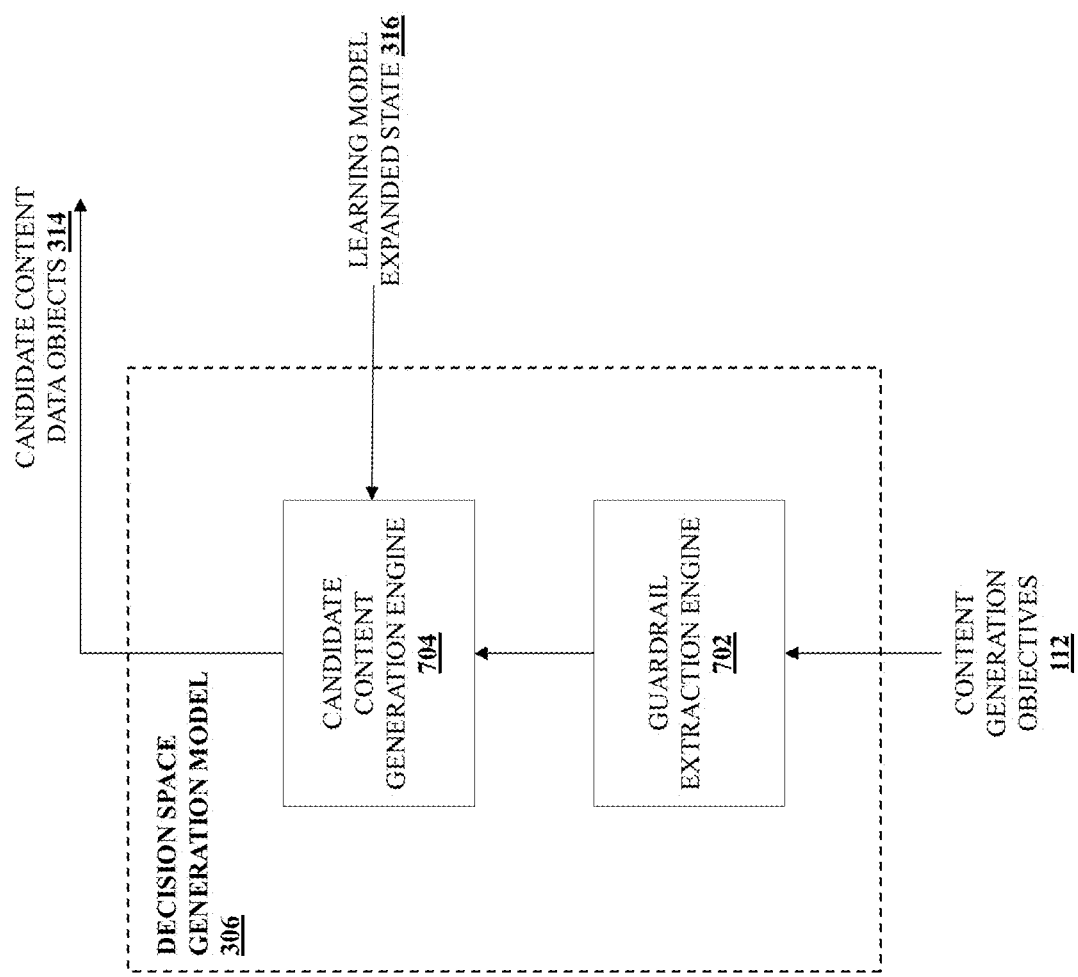
FIG. 7 illustrates a block diagram of an example decision space generation model within a content generation framework in accordance with an example embodiment of the present disclosure.

Referring now to FIG. 7, an example decision space generation model 306 is provided. As depicted in FIG. 7, the decision space generation model 306 includes a guardrail extraction engine 702 and a candidate content generation engine 704. The decision space generation model 306 is configured to generate a plurality of candidate content data objects 314 based on the learning model expanded state 316 and the content generation objectives 112.

As depicted in FIG. 7, the example decision space generation model 306 includes a guardrail extraction engine 702. The guardrail extraction engine 702 refers to software and/or hardware configured to determine one or more characteristic ranges and/or characteristic step limitations based at least in part on content generation objectives 112. As described herein, content data objects comprise one or more variable interactive action characteristics. Variable interactive action characteristics refer to one or more characteristics of a content data object that may be adjusted. For example, a variable interactive action characteristic may include a discount percentage, a voucher amount, a re-use limit, or other similar variable characteristic. Various characteristic ranges may be provided to limit the available range of the decision space. The various characteristic ranges and the available ranges of each variable interactive action characteristic define the decision space for a target client.

In some embodiments, the characteristic ranges may be defined directly or indirectly through the content generation objectives 112. A vendor may specify in the content generation objectives 112 a characteristic range for one or more variable interactive action characteristics. For example, a characteristic range of a discount percentage of a particular product may be set between 0% and 40%. In addition, some characteristic ranges may be established based on industry standard, or otherwise provide through code configuration or configuration settings. The guardrail extraction engine 702 extracts the characteristic ranges from each of these disparate sources and stores the characteristic ranges for use by the candidate content generation engine 704.

Similarly, characteristic step limitations may be specified in content generation objectives 112, based on industry standards, through code configuration, or though other configuration settings.

As further depicted in FIG. 7, the example decision space generation model 306 includes a candidate content generation engine 704. The candidate content generation engine 704 includes software and/or hardware configured to generate candidate content data objects 314 distributed within the decision space associated with a target client and based at least in part on the learning model expanded state 316 associated with the target client. In some embodiments, various content data objects may be generated based on combinations of variable interactive action characteristics within the characteristic range for the particular variable interactive action characteristics. In some embodiments, various packages of content data object may be generated combining multiple content data object types. For example, in one specific embodiment, some candidate content data objects 314 may include a particular redeemable voucher, such as a credit to a vendor location, while other candidate content data objects 314 include a credit to the vendor location and a credit to a partner vendor. In some embodiments, candidate content data objects 314 may be equally spaced throughout the decision space. In some embodiments, candidate content data objects 314 may be distributed throughout the decision space based on desired outcomes.

In some embodiments, the decision space generation model 306 may include a machine learning model to aid in the generation of candidate content data objects 314 defining the decision space for a particular target client. For example, a machine learning model may determine the distribution of candidate content data objects 314 within the decision space to realize improved results from the content generation model, and the experimental content generation learning model downstream. In addition, the optimal number of candidate content data objects 314 likely to produce content data objects meeting content generation objectives 112 may be determined by a machine learning model. Providing the optimal number of candidate content data objects 314 may increase the efficiency of the content generation model, and the experimental content generation learning model, for example, by reducing the number of content data objects that may be analyzed by the downstream models.

Referring now to FIG. 8, an example autonomous content generation system 800 is provided. As depicted in FIG. 8, the example content generation framework 802 is configured to generate renderable content data objects 114 and present the renderable content data objects 114 to a target client 108 via an environment interface 308 interacting with a network 106. The example content generation framework 802 is further configured to receive or access interaction data signals 116 at the environment interface 308 indicative of one or more responsive actions 324 taken by the target client 108. As further depicted in FIG. 8, the content generation framework 802 further includes a supervised learning model 310 configured to access a content generation learning model state 318 generated by the environment interface 308 and content generation objectives 112 to generate a learning model expanded state 316. The decision space generation model 306 accesses the learning model expanded state 316 and content generation objectives 112 to generate candidate content data objects 314. As further depicted in FIG. 8, the content generation model 304 accesses the candidate content data objects 314 and generates rated content data objects 312 based at least in part on the candidate content data objects 314 and content generation objectives 112. The experimental content generation learning model 302 leverages the rated content data objects 312 to generate one or more content data objects 326 for the target client 108. As further depicted in FIG. 8, the example content generation framework 802 includes an experimental tuning model 404 which may be included in a content generation framework 802 to inform the experimental content generation learning model 302 during the selection of the content data object 326.

As depicted in FIG. 8, the example content generation framework 802 includes an autonomous feature selection model 804. The autonomous feature selection model 804 refers to hardware and/or software configured to generate a dynamic framework feature set 808 based at least in part on the initial user experience content dataset 806 and/or the feedback user experience content data set within the content generation learning model state 318; and the content generation objectives 112. The autonomous feature selection model 804 may leverage various feature selection techniques to generate a dynamic framework feature set 808 comprising a set of features selected to provide more accurate predictions at various models within the content generation framework 802.

During initial configuration, an initial user experience content dataset 806 is used to generate an initial dynamic framework feature set 808. However, during operation, the dynamic framework feature set 808 is periodically updated based on the content generation learning model state 318 including a feedback user experience content dataset.

The dynamic framework feature set 808 may be utilized by any machine learning model within the content generation framework. For example, the dynamic framework feature set 808 may be used by the supervised learning model 310, the content generation model 304, the experimental tuning model 404, and any other machine learning model utilized by the content generation framework 802. The use of a dynamic framework feature set 808 may increase the accuracy of the machine learning model predictions within the content generation framework 802 improving the overall accuracy of the content generation framework 802. In addition, a dynamic framework feature set 808 generated by an autonomous feature selection model 804 may enable rapid improvements to machine learning models within the content generation framework 802, particularly in a data-constrained environment. In some embodiments, multiple machine learning models may be leveraged by the autonomous feature selection model 804 to generate a plurality of dynamic framework feature sets 808. For example, a machine learning model may be trained to generate a dynamic framework feature set 808 for the supervised learning model 310, a separate machine learning model may be trained to generate a separate dynamic framework feature set 808 for the content generation model 304, one for the experimental tuning model 404, and so on.

Figure 9:
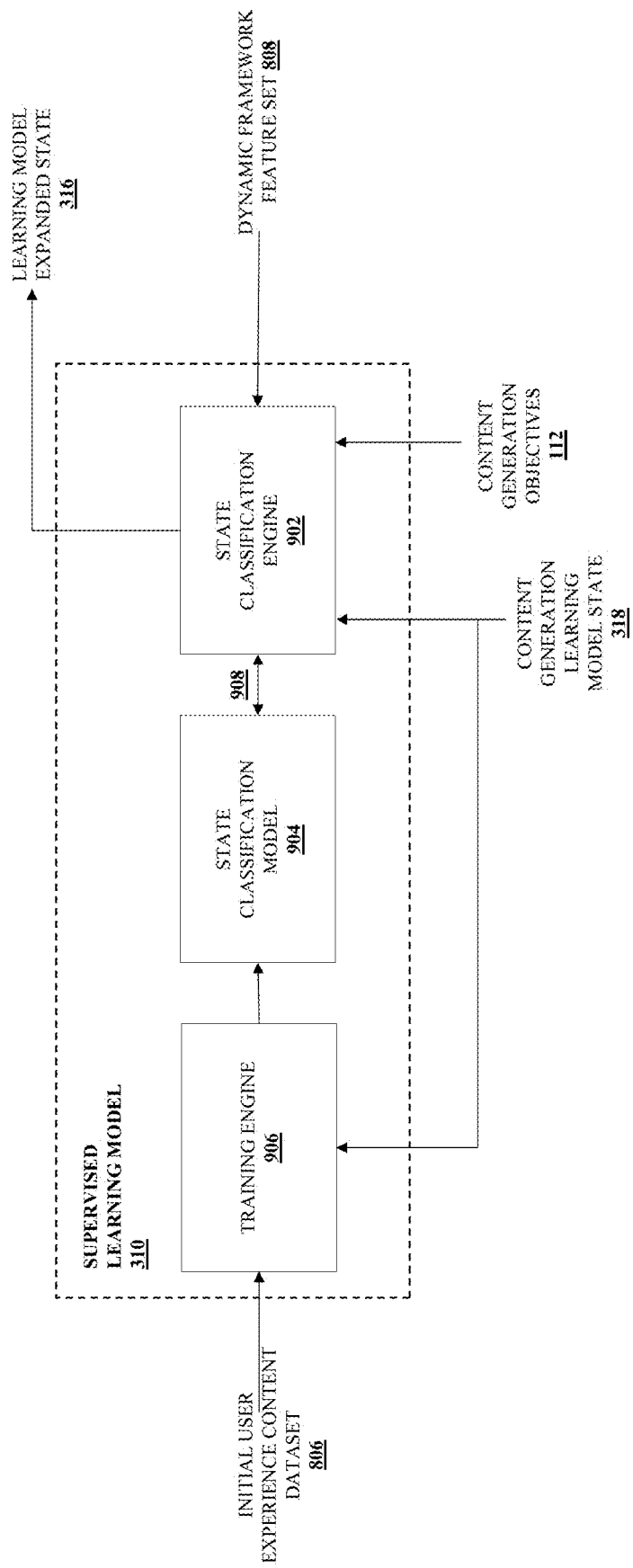
FIG. 9 illustrates a block diagram of an example supervised learning model within an autonomous feature selection model in accordance with an example embodiment of the present disclosure.

Referring now to FIG. 9, an example supervised learning model 310 is provided. As depicted in FIG. 9, the example supervised learning model 310 includes a state classification engine configured to utilize a content generation learning model state 318 and content generation objectives 112 to generate a learning model expanded state 316. As further depicted in FIG. 9, the state classification engine 902 leverages a state classification model 904 to determine the learning model expanded state 316 based on features of the content generation learning model state 318. The features of the content generation learning model state 318 are selected based on the dynamic framework feature set 808. The state classification model 904 of FIG. 9 is trained by a training engine 906 configured to initially train the state classification model 904 based at least in part on the initial user experience content dataset 806 and update the state classification model 904 based on the feedback user experience content dataset as provided by the content generation learning model state 318.

As depicted in FIG. 9, the example supervised learning model 310 includes a state classification model 904. A state classification model 904 refers to circuitry comprising hardware and/or software configured to receive a data vector 908 comprising features of the content generation learning model state 318 and generate one or more expanded state characteristics as part of a learning model expanded state 316. In some embodiments, a plurality of supervised learning models 310 may be deployed in a content generation framework, for example, a supervised learning model 310 may be deployed for each expanded state characteristic included in the learning model expanded state 316.

A state classification model 904 may comprise a plurality of mathematical and statistical models trained to determine correlations between the input state of the environment (e.g., content generation learning model state 318) and output expanded state characteristics. In some embodiments, the state classification model 904 may comprise an artificial neural network or other similar data classifier, including, but not limited to, Bayesian networks, genetic algorithms, regression models, clustering models, and/or a random forest model.

The state classification model 904 is trained and updated by a training engine 906. A training engine 906 may include circuitry including hardware and/or software configured to receive a vector of data representing a current state (e.g., initial user experience content dataset 806, content generation learning model state 318) and corresponding expanded state characteristics. The training engine 906 is configured to adjust the parameters and hyperparameters comprising the mathematical and statistical models of the state classification model 904 to continually improve the accuracy of the state classification model 904 based on received state data and corresponding actions of the target client.

For example, the training engine 906 may utilize the initial user experience content dataset 806 to train the state classification model 904 during the training phase, based on historical observed state and resulting expanded state characteristics. Further, during the operation phase, the training engine 906 may update the state classification model 904 based on the feedback user experience content dataset included in the content generation learning model state 318.

During a classification phase of the supervised learning model 310, the state classification engine 902 may generate a vector of data representing the current state. The vector of data representing the current state may include a plurality of features based on the dynamic framework feature set 808. The dynamic framework feature set 808 may comprise a list of features programmatically selected to provide accurate expanded state characteristics when used as inputs to the state classification model 904. The state classification engine 902 may input the vector of data representing the current state to the state classification model 904 and receive one or more expanded state characteristics based on the content generation learning model state 318. Expanded state characteristics refer to one or more characteristics of the current state of the learning environment related to the target client that may be derived from the content generation learning model state 318. Non-limiting examples of expanded state characteristics may include characteristics related to the status of one or more users associated with the target client with the vendor, for example, whether the associated user is a potential customer, new customer, existing customer, or dormant customer. Other expanded state characteristics may include the likelihood of an associated customer to churn or cease interactions with the vendor; likelihood of a customer to increase engagement quantity and/or quality (e.g., increased spending) with the vendor; likelihood of a customer who has ceased interactions with the vendor to re-engage with the vendor (e.g., reactivation); likelihood of a customer to begin regularly engaging with vendor (e.g., acquisition); etc. By way of example, a new customer who is minimally or is not associated with a vendor may have a different expanded state characteristic for whether they will cease interactions. The expanded state characteristics may be combined with the content generation learning model state 318 to generate a learning model expanded state 316.

Figure 10:
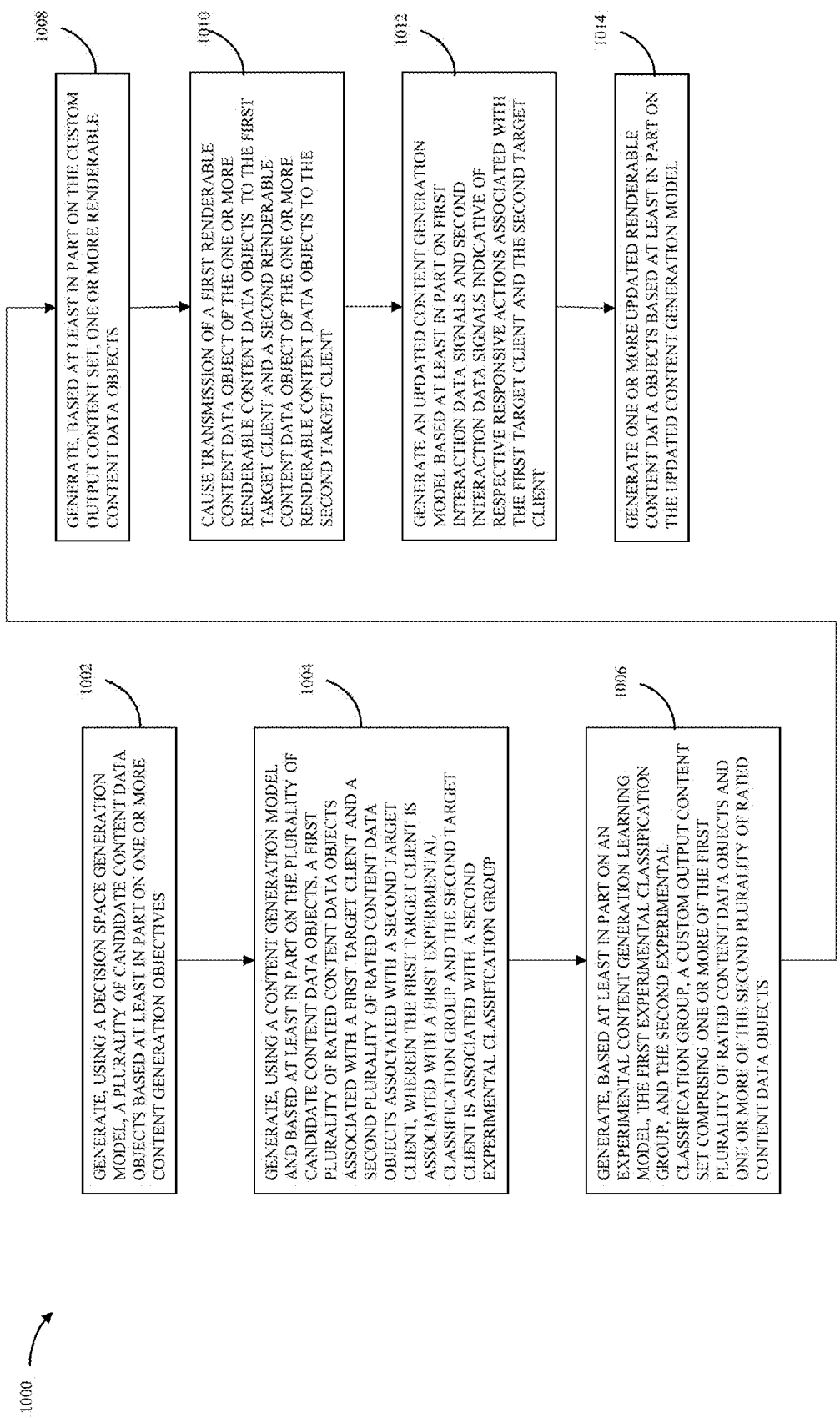
FIG. 10 illustrates a process depicting example operations for rapid machine learning in a data-constrained environment in accordance with an example embodiment of the present disclosure.

Referring now to FIG. 10, an example process 1000 for rapid machine learning in a data constrained environment and generation of custom data output content for each of a plurality of target clients is provided. At block 1002, the content generation framework (e.g., content generation framework 102, 402, 802) generates, using a decision space generation model (e.g., decision space generation model 306), a plurality of candidate content data objects (e.g., candidate content data objects 314) based at least in part on one or more content generation objectives (e.g., content generation objectives 112). As described herein, a decision space is defined by the variable interactive action characteristics of a content data object and associated characteristic ranges. In addition, in some embodiments, multiple content data types may be selectively included in a content data object. A decision space generation model may generate candidate content data objects 314 based on a distribution across the available decision space. Generating candidate content data objects across the available decision space provides opportunities for experimental content data objects (e.g., content data objects 326, renderable content data object 114) to be provided to a target client (e.g., target client 108) as determined by the experimental content generation learning model (e.g., experimental content generation learning model 302).

At block 1004, the content generation framework generates, using a content generation model (e.g., content generation model 304) and based at least in part on the plurality of candidate content data objects a first plurality of rated content data objects (e.g., rated content data objects 312) associated with a first target client and a second plurality of rated content data objects associated with a second target client, wherein the first target client is associated with a first experimental classification group and the second target client is associated with a second experimental classification group. As described herein the content generation model may utilize a machine learning model to generate content data object ranks, content data object scores, and/or confidence values for each candidate content data object. The content data object rank, content data object score, and confidence values may be determined based on one or more objectives provided by the content generation objectives 112. The content generation model 304 may be trained based at least in part on an initial user experience content dataset and continually updated based at least in part on the content generation learning model state (e.g., content generation learning model state 318). The first plurality of content data objects is generated and rated based at least in part on an associated target client. The target client may be associated with a first experimental classification group (e.g., a control group, an exploitation group, or an exploration group). In some embodiments the experimental classification group may be for a single iteration in which a renderable content data objected is presented to a target client.

The second plurality of content data objects are generated and rated based at least in part on an associated target client. The target client may be associated with a second experimental classification group (e.g., a control group, an exploitation group, or an exploration group). In some embodiments the experimental classification group may be for a single iteration in which a renderable content data objected is presented to a target client. In some embodiments, the second experimental classification group may be different than the first experimental classification group.

At block 1006, the content generation framework generates, based at least in part on an experimental content generation learning model (e.g., experimental content generation learning model 302), the first experimental classification group, and the second experimental classification group, a custom output content set comprising one or more of the first plurality of rated content data objects, and one or more of the second plurality of rated content data objects. A custom output content set refers to a combination of content data objects intended for transmission to one or more target clients. The content data object selected by the content generation framework for a target client may be adjusted based at least in part on the experimental classification group. Thus, although similarly situated, the content data object selected from the first plurality of rated content data objects associated with the first target client may be different than the content data object selected from the second plurality of rated content data objects associated with the second target client.

For example, the first experimental classification group may be associated with the control classification group. In such an instance, the content data object may be selected in accordance with a control group framework, for example, the highest rated content data object of the first plurality of rated content data objects in accordance with all characteristic step limitations, may be selected. Similarly, the second experimental classification group may be associated with the exploration classification group. In such an instance, the content data object may be selected in accordance with an exploration group framework, for example, a random content data object of the second plurality of rated content data objects, may be selected.

Selecting content data objects for a target client based on an experimental classification group enables rapid exploration of the content generation framework decision space. In addition, the selection of content data objects may be informed by the output of the experimental tuning model 404. For example, a learning model comprising the experimental tuning model may be utilized to select from the rated content data objects based on the amount or quality of information returned by the interaction of the target client or the associated user with the renderable content data object based on the selected content data object.

At block 1008, the content generation framework generates, based at least in part on the custom output content set, one or more renderable content data objects (e.g., renderable content data objects 114). In some embodiments, a renderable content data object may be generated from the content data object selected by the experimental content generation learning model. A renderable content data object may include additional data including graphics, notification indicators, communication data, or other data necessary to render the content data object on a device of the target client.

At block 1010, the content generation framework causes transmission of a first renderable content data object of the one or more renderable content data objects to the first target client and a second renderable content data object of the one or more renderable content data objects to the second target client. In some embodiments, the first renderable content data object is associated with the first plurality of rated content data objects, and the second renderable content data object is associated with the second plurality of rated content data objects. The first and second renderable content data objects may be transmitted through a network directly to the target client, stored in a location accessible to the target client, or otherwise presented to the target client.

At block 1012, the content generation framework generates an updated content generation model based at least in part on first interaction data signals and second interaction data signals indicative of respective responsive actions associated with the first target client and the second target client. In some embodiments, the content generation framework is configured to receive first interaction data signals (e.g., interaction data signals 116) indicative of a first responsive action (responsive action 324) associated with the first target client and second interaction data signals indicative of a second responsive action associated with the second target client. Upon receipt of a renderable content data object, a target client may perform a responsive action. A responsive action may include clicking a button, opening a link, respond to a text or email, purchasing a product, viewing the content data object, deleting the content data object, no response, or any other reaction to the electronic communication. The responsive action and other information relative to the responsive action may be transmitted or otherwise be made available to the content generation framework.

An updated content generation model refers to any content generation model in which parameters have been updated based on interaction data signals. In some embodiments, the machine learning models comprising the supervised learning model, the experimental tuning model, and so on may also be updated based on the interaction data signals received. Updates may be applied to a machine learning model, for example, by retraining the machine learning model or a portion of the machine learning model based on the interaction data signals. In some embodiments, the machine learning models may be updated with each iteration. In some embodiments, the interaction data signals and associated content generation learning model state associated with the target client may be stored and/or accumulated and the machine learning models may be updated periodically.

At block 1014, the content generation framework generates one or more updated renderable content data objects based at least in part on the updated content generation model. Upon update of the machine learning models comprising the content generation framework, subsequent content data objects may be selected and transmitted to the target clients based on the updated content generation model(s). Updated renderable content data objects refer to any renderable content data objects based on content data objects selected based on one or more updated content generation models.

Continuously updating one or more machine learning models comprising the content generation framework based on the content generation learning model state may enable the autonomous content generation system to operate autonomously. For example, in one specific embodiment, one or more machine learning models of a content generation framework may be trained based on an initial user experience content dataset. The content generation framework may generate a renderable content data object specifically selected for a target client. Based on a responsive action by the target client, the content generation learning model state may be updated at the content generation framework. Periodically, the content generation learning model state is provided to the one or more machine learning models comprising the content generation framework and the one or more machine learning models are updated. Based on the updated machine learning models subsequent updated content data objects are automatically selected specifically for the target client. Continuous transmission of renderable content data objects and receipt of interaction data signals autonomously improve the generation of content data objects for the target clients.

Use of the experimental content generation learning model to rapidly generate custom content data objects for target clients may provide a number of technical advantages. For example, the content generation framework described herein may enable the rapid deployment in an autonomous content generation system with little historical data. Such a technical advantage enables deployment of the content generation framework in new applications or applications in which data was not previously recorded.

In addition, the content generation framework described herein reduces the number of iterations performed by the content generation framework and associated machine learning models. By utilizing experimental classification groups to more efficiently explore the decision space available to the autonomous content generation system, the number of iterations performed by the autonomous content generation system before generating reliable outcomes may be greatly reduced. Reduction of iterations can be crucial in an environment in which iterations are spaced by days, weeks, months, or even years. Traditional processes may require months or years of historical data before accurate predictions are obtained.

Further, the content generation framework herein described may operate in data-constrained environments or environments in which less data is captured and stored for training and classification purposes. Reducing the size of the datasets provided to the content generation framework requires less storage space to operate the content generation framework. Such reduced datasets may lead to performance gains in the content generation framework and may enable deployment of the content generation framework on systems having limited data storage.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An apparatus comprising one or more processors and one or more storage devices storing instructions that are operable, when executed by the one or more processors, to cause the one or more processors to:
   generate, using a decision space generation model, a plurality of candidate content data objects based at least in part on one or more content generation objectives;
   generate, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group;
   generate, based at least in part on an experimental content generation learning model, the first experimental classification group, and the second experimental classification group, a custom output content set comprising one or more of the first plurality of rated content data objects and one or more of the second plurality of rated content data objects;
   generate, based at least in part on the custom output content set, one or more renderable content data objects;
   cause transmission of a first renderable content data object of the one or more renderable content data objects to the first target client and a second renderable content data object of the one or more renderable content data objects to the second target client;
   generate an updated content generation model based at least in part on a content generation learning model state,
   wherein the content generation learning model state comprises at least first interaction data signals and second interaction data signals indicative of respective responsive actions associated with the first target client and the second target client;
   generating updated rated content data object based at least in part on the updated content generation model; and
   generate one or more updated renderable content data objects based at least in part on the updated rated content data objects.

2. The apparatus of claim 1, wherein the first renderable content data object is associated with the first plurality of rated content data objects, and the second renderable content data object is associated with the second plurality of rated content data objects.

3. The apparatus of claim 1, wherein each rated content data object comprises at least one of a content data object rank or a content data object score.

4. The apparatus of claim 3, wherein the content data object rank or the content data object score is determined based at least in part on the one or more content generation objectives.

5. The apparatus of claim 3, wherein each rated content data object comprises one or more variable interactive action characteristics.

6. The apparatus of claim 5, wherein the one or more content generation objectives define a characteristic range for at least one of the one or more variable interactive action characteristics.

7. The apparatus of claim 6, wherein the first experimental classification group and the second experimental classification group comprise a control group, an exploration group, or an exploitation group.

8. The apparatus of claim 7, wherein the content generation model is configured to determine a control content data object based at least in part on the content data object rank or the content data object score.

9. The apparatus of claim 8, wherein the content generation model is further configured to determine the control content data object based at least in part on the characteristic range, wherein the at least one of the one or more variable interactive action characteristics is within the characteristic range.

10. The apparatus of claim 8, wherein generating the custom output content set further comprises:
   selecting the control content data object from a plurality of rated content data objects in an instance in which an experimental classification group is the control group.

11. The apparatus of claim 7, wherein generating the custom output content set further comprises:
   selecting a rated content data object with a highest content data object rank or a highest content data object score in an instance in which an experimental classification group is the exploitation group.

12. The apparatus of claim 7, wherein generating the custom output content set further comprises:
   selecting a rated content data object according to an exploration group framework in an instance in which an experimental classification group is the exploration group.

13. The apparatus of claim 12, wherein the exploration group framework is based at least in part on a random input.

14. The apparatus of claim 1, wherein the one or more storage devices store instructions that are operable, when executed by the one or more processors, to further cause the one or more processors to:
   determine, using an experimental tuning model, an optimal rated content data object based on a plurality of content generation objectives; and
   select the optimal rated content data object in the custom output content set.

15. The apparatus of claim 3, wherein the one or more storage devices store instructions that are operable, when executed by the one or more processors, to further cause the one or more processors to:
   generate, using the content generation model, a confidence value associated with each rated content data object in the first plurality of rated content data objects and second plurality of rated content data objects, wherein the confidence value corresponds with a confidence in the content data object rank or the content data object score associated with the rated content data object.

16. The apparatus of claim 15, wherein the one or more storage devices store instructions that are operable, when executed by the one or more processors, to further cause the one or more processors to:
   determine, using an experimental tuning model, a confidence enhancing content data object from a plurality of rated content data objects, wherein the confidence enhancing content data object increases the confidence value associated with one or more ranked content data objects; and
   select the confidence enhancing content data object in the custom output content set.

17. The apparatus of claim 1, wherein the first interaction data signals are indicative of a first responsive action associated with the first target client and the second interaction data signals are indicative of a second responsive action associated with the second target client.

18. The apparatus of claim 1, wherein the one or more updated renderable content data objects comprise a first renderable content data object associated with the first target client and a second renderable content data object associated with the second target client.

19. A computer-implemented method, the computer-implemented method comprising:
   generating, using a decision space generation model, a plurality of candidate content data objects based at least in part on one or more content generation objectives;
   generating, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group;
   generating, based at least in part on an experimental content generation learning model, the first experimental classification group, and the second experimental classification group, a custom output content set comprising one or more of the first plurality of rated content data objects and one or more of the second plurality of rated content data objects;
   generating, based at least in part on the custom output content set, one or more renderable content data objects;
   causing transmission of a first renderable content data object of the one or more renderable content data objects to the first target client and a second renderable content data object of the one or more renderable content data objects to the second target client;
   generating an updated content generation model based at least in part on a content generation learning model state,
   wherein the content generation learning model state comprising at least first interaction data signals and second interaction data signals indicative of respective responsive actions associated with the first target client and the second target client;

generate updated rated content data objects based at least in pact on the updated content generation model,
and generating one or more updated renderable content data objects based at least in part on the updated rated content data object.

20. A computer program product comprising at least one non-transitory computer-readable storage medium having computer-readable program code portions stored therein, the computer-readable program code portions comprising an executable portion configured to:

generate, using a decision space generation model, a plurality of candidate content data objects based at least in part on one or more content generation objectives;

generate, using a content generation model and based at least in part on the plurality of candidate content data objects, a first plurality of rated content data objects associated with a first target client and a second plurality of rated content data objects associated with a second target client, wherein the first target client is associated with a first experimental classification group and the second target client is associated with a second experimental classification group;

generate, based at least in part on an experimental content generation learning model, the first experimental classification group, and the second experimental classification group, a custom output content set comprising one or more of the first plurality of rated content data objects and one or more of the second plurality of rated content data objects;

generate, based at least in part on the custom output content set, one or more renderable content data objects;

cause transmission of a first renderable content data object of the one or more renderable content data objects to the first target client and a second renderable content data object of the one or more renderable content data objects to the second target client;

generate an updated content generation model based at least in part on a content generation learning model state, wherein the content generation learning model state comprises at least first interaction data signals and second interaction data signals indicative of respective responsive actions associated with the first target client and the second target client;

generate updated rated content data objects based at least in part on the updated content generation model,
and generate one or more updated renderable content data objects based at least in part on the updated rated content data objects.

* * * * *

UNITED STATES PATENT AND TRADEMARK OFFICE
CERTIFICATE OF CORRECTION

| | | |
|---|---|---|
| PATENT NO. | : 12,165,027 B1 | Page 1 of 1 |
| APPLICATION NO. | : 18/665210 | |
| DATED | : December 10, 2024 | |
| INVENTOR(S) | : Anthony Chong et al. | |

It is certified that error appears in the above-identified patent and that said Letters Patent is hereby corrected as shown below:

In the Claims

In Column 40, Line 61, Claim 1, delete "generating updated" and insert -- generate updated --, therefor.
In Column 40, Line 61, Claim 1, delete "object" and insert -- objects --, therefor.
In Column 42, Lines 63-64, Claim 19, delete "comprising" and insert -- comprises --, therefor.
In Column 43, Line 2, Claim 19, delete "in pact" and insert -- in part --, therefor.
In Column 43, Line 6, Claim 19, delete "object." and insert -- objects. --, therefor.
In Column 44, Line 21, Claim 20, delete "model," and insert -- model; --, therefor.

Signed and Sealed this
Twenty-seventh Day of May, 2025

Coke Morgan Stewart
*Acting Director of the United States Patent and Trademark Office*